(12) United States Patent
Heffernan et al.

(10) Patent No.: US 9,906,835 B2
(45) Date of Patent: Feb. 27, 2018

(54) SYSTEMS AND METHODS TO VERIFY AND/OR CORRECT MEDIA LINEUP INFORMATION

(71) Applicant: The Nielsen Company (US), LLC, New York, NY (US)

(72) Inventors: Ronan Heffernan, Wesley Chapel, FL (US); Chad A. Hage, Oldsmar, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 15/278,348

(22) Filed: Sep. 28, 2016

(65) Prior Publication Data
US 2017/0019708 A1    Jan. 19, 2017

Related U.S. Application Data

(63) Continuation of application No. 14/511,805, filed on Oct. 10, 2014, now Pat. No. 9,497,505.
(Continued)

(51) Int. Cl.
| | |
|---|---|
| *H04N 7/16* | (2011.01) |
| *H04N 21/442* | (2011.01) |
| *H04N 21/24* | (2011.01) |
| *H04N 21/234* | (2011.01) |
| *H04N 21/235* | (2011.01) |
| *H04N 21/44* | (2011.01) |
| *H04N 21/8352* | (2011.01) |
| *H04N 21/262* | (2011.01) |

(52) U.S. Cl.
CPC ..... *H04N 21/44204* (2013.01); *H04N 21/235* (2013.01); *H04N 21/23418* (2013.01); *H04N 21/2407* (2013.01); *H04N 21/262* (2013.01); *H04N 21/44008* (2013.01); *H04N 21/8352* (2013.01)

(58) Field of Classification Search
CPC .................................................. H04N 21/482
See application file for complete search history.

(56) References Cited

U.S. PATENT DOCUMENTS

| | | |
|---|---|---|
| 4,677,466 A | 6/1987 | Lert, Jr. et al. |
| 5,481,294 A | 1/1996 | Thomas et al. |
| | (Continued) | |

OTHER PUBLICATIONS

U.S., "Non-Final Office Action," issued in connection with U.S. Appl. No. 14/511,805, dated Dec. 31, 2015, 10 pages.
(Continued)

*Primary Examiner* — Fernando Alcon
(74) *Attorney, Agent, or Firm* — Hanley, Flight & Zimmerman, LLC

(57) ABSTRACT

Systems and methods to verify and/or correct media lineup information are disclosed. An example method includes comparing signature data representative of media to recurring segment reference signatures in a signature database. The recurring segment reference signatures are representative of segments of media recurring in multiple different episodes of a same media series. The example method further includes, when the signature data matches one of the recurring segment reference signatures, generating identifying information for the media indicating the media as corresponding to an episode of the media series.

20 Claims, 11 Drawing Sheets

Related U.S. Application Data

(60) Provisional application No. 62/057,672, filed on Sep. 30, 2014.

(56) References Cited

U.S. PATENT DOCUMENTS

| | | | |
|---|---|---|---|
| 5,668,917 | A | 9/1997 | Lewine |
| 7,299,483 | B2 | 11/2007 | Williams |
| 7,460,684 | B2 | 12/2008 | Srinivasan |
| 7,793,318 | B2 | 9/2010 | Deng |
| 7,882,525 | B2 | 2/2011 | Haque |
| 8,214,907 | B1 | 7/2012 | Sobel et al. |
| 8,229,216 | B2 | 7/2012 | Chan et al. |
| 8,255,938 | B2 | 8/2012 | Lee et al. |
| 8,457,972 | B2 | 6/2013 | Topchy et al. |
| 8,489,884 | B2 | 7/2013 | Srinivasan |
| 8,514,907 | B2 | 8/2013 | Wright et al. |
| 8,516,533 | B2 | 8/2013 | Davis et al. |
| 8,559,516 | B2 | 10/2013 | Hardacker et al. |
| 8,600,531 | B2 | 12/2013 | Topchy et al. |
| 8,724,696 | B2 * | 5/2014 | Byford .................. H04N 19/00 375/240.01 |
| 8,819,717 | B2 | 8/2014 | Deng |
| 9,330,189 | B2 * | 5/2016 | Raichelgauz ..... G06F 17/30884 |
| 9,438,965 | B2 | 9/2016 | Nelson et al. |
| 9,497,505 | B2 | 11/2016 | Heffernan et al. |
| 2003/0018977 | A1 | 1/2003 | McKenna |
| 2004/0002310 | A1 | 1/2004 | Herley et al. |
| 2005/0021810 | A1 * | 1/2005 | Umemura ............ G06F 3/1462 709/231 |
| 2005/0232411 | A1 | 10/2005 | Srinivasan et al. |
| 2006/0153296 | A1 | 7/2006 | Deng |
| 2006/0184961 | A1 | 8/2006 | Lee et al. |
| 2006/0195861 | A1 | 8/2006 | Lee |
| 2006/0271947 | A1 * | 11/2006 | Lienhart .......... G06F 17/30787 725/19 |
| 2007/0124756 | A1 | 5/2007 | Covell et al. |
| 2007/0130580 | A1 | 6/2007 | Covell et al. |
| 2007/0274537 | A1 | 11/2007 | Srinivasan |
| 2008/0091288 | A1 | 4/2008 | Srinivasan |
| 2008/0256575 | A1 | 10/2008 | Raju et al. |
| 2008/0276265 | A1 | 11/2008 | Topchy et al. |
| 2009/0094631 | A1 | 4/2009 | Whymark et al. |
| 2009/0254941 | A1 * | 10/2009 | Cirrincione .............. H04N 5/50 725/39 |
| 2010/0070523 | A1 | 3/2010 | Delgo et al. |
| 2010/0156916 | A1 * | 6/2010 | Muikaichi ................ G09G 5/14 345/536 |
| 2011/0292291 | A1 | 12/2011 | Deng |
| 2012/0003923 | A1 | 1/2012 | Pazos et al. |
| 2013/0007790 | A1 | 1/2013 | McMillan |
| 2013/0160042 | A1 | 6/2013 | Stokes et al. |
| 2013/0261781 | A1 | 10/2013 | Topchy et al. |
| 2013/0272628 | A1 * | 10/2013 | Lee ........................ H04N 5/272 382/294 |
| 2013/0276006 | A1 | 10/2013 | Besehanic |
| 2013/0276033 | A1 | 10/2013 | Francini et al. |
| 2014/0059587 | A1 | 2/2014 | Davis et al. |
| 2014/0088742 | A1 | 3/2014 | Srinivasan et al. |
| 2014/0130099 | A1 * | 5/2014 | Kunisetty .......... H04N 21/4667 725/50 |
| 2014/0150001 | A1 * | 5/2014 | McMillan ........ H04N 21/44213 725/9 |
| 2014/0157312 | A1 | 6/2014 | Williams et al. |
| 2014/0201774 | A1 | 7/2014 | Neumeier et al. |
| 2014/0259078 | A1 * | 9/2014 | Arling ................ H04N 21/4383 725/56 |
| 2014/0325555 | A1 * | 10/2014 | Khader ............. H04N 21/2668 725/32 |
| 2014/0337888 | A1 | 11/2014 | Doan et al. |
| 2015/0082351 | A1 * | 3/2015 | Kashyap ................ H04N 21/21 725/44 |
| 2015/0181269 | A1 | 6/2015 | McMillan |
| 2015/0365722 | A1 * | 12/2015 | Oztaskent ........ H04N 21/44213 725/18 |
| 2016/0066005 | A1 | 3/2016 | Davis et al. |
| 2016/0094877 | A1 | 3/2016 | Heffernan et al. |

OTHER PUBLICATIONS

U.S., "Notice of Allowance and Fee(s) Due," issued in connection with U.S. Appl. No. 14/511,805, dated Jun. 28, 2016, 7 pages.

"Automated Measurement of Lineups," Wikipedia, The Free Encyclopedia, Last Modified on Jun. 15, 2014, retrieved from http://en.wikipedia.org/wiki/Automated_Measurement_of_Lineups (2 pages).

* cited by examiner

SYSTEMS AND METHODS TO VERIFY AND/OR CORRECT MEDIA LINEUP INFORMATION

RELATED APPLICATION

This patent claims priority to U.S. application Ser. No. 14/511,805, filed on Oct. 10, 2014, and to U.S. Provisional Application Ser. No. 62/057,672, filed on Sep. 30, 2014, the entireties of which are incorporated herein by reference.

FIELD OF THE DISCLOSURE

This disclosure relates generally to audience measurement, and, more particularly, to systems and methods to verify and/or correct media lineup information.

BACKGROUND

Audience measurement has traditionally been performed using methods such as having panelists keep a log or diary of media exposure and/or using physical meter devices to detect media usage and/or exposure in an automated fashion. Often, the automatic detection of media exposure depends upon the collection of signatures and/or watermarks from the media.

DETAILED DESCRIPTION

Figure 1:
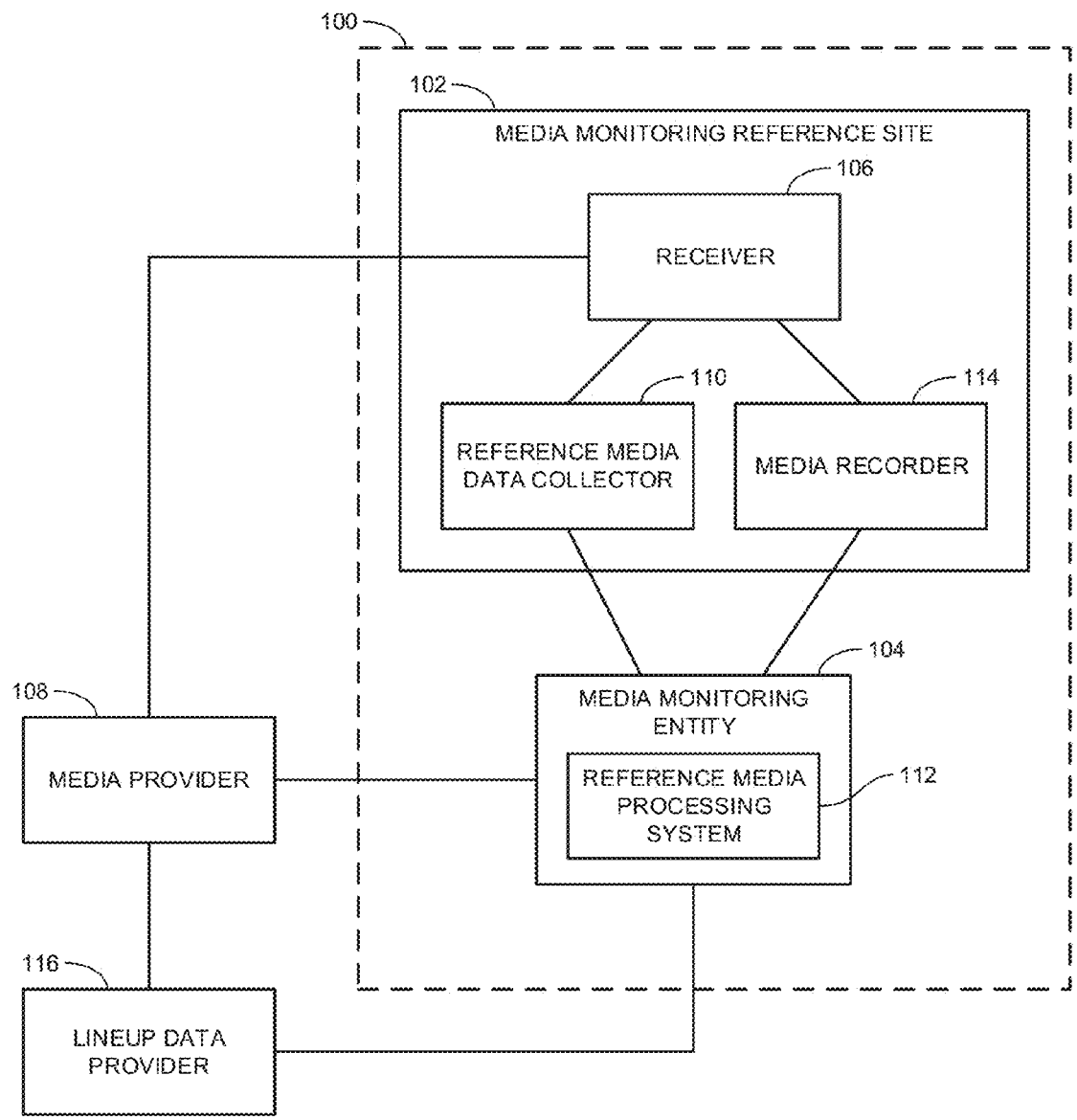
FIG. 1 illustrates an example system to verify and/or correct lineup information.

Linear television has been the model of television distribution in the United States since the 1940's. In a linear television model, a broadcaster schedules programs to air at specific times. Consumers can obtain guides, which could be paper or electronic, to determine what program is being aired at a given time for a given source. Frequently, media monitoring entities (e.g., The Nielsen Company (US), LLC) also rely on programming schedules (also referred to as media lineup information) to assist in measuring the size and/or composition of audiences for such linear television programming (e.g., to determine ratings for different media programs). In particular, media monitoring entities enlist panelists from which media exposure data is collected. The media exposure data is indicative of the media to which the panelists are exposed. Frequently, in the context of linear media, the collected media exposure data includes an indication of the time during which a panelist is exposed to media and an indication of the source of the media (e.g., the network, station, and/or channel to which a panelist's media presentation device is tuned). Based on the source identifying information and the time when the media was accessed, media monitoring entities can look up the identified source (e.g., network, station, and/or channel) at the identified time in a media lineup table to specifically identify the media program(s) to which the panelist was exposed. In addition to linear television, this same approach may be used in other forms of linear media such as, for example, radio.

An example method to collect media exposure data from panelists is through the use of watermarking and/or signatures. Watermarking is a technique used to identify media such as television broadcasts, radio broadcasts, advertisements (television and/or radio), downloaded media, streaming media, prepackaged media, etc. Watermarking includes audio watermarking and video watermarking. Existing audio watermarking techniques identify media by embedding one or more audio codes (e.g., one or more watermarks), such as media identifying information and/or an identifier that may be mapped to media identifying information (e.g., via a lookup in a media lineup table), into an audio component of a media signal. Video watermarking is analogous to audio watermarking, but the video watermark is placed in a video component of the media signal. In some examples, the audio or video component is selected to have a signal characteristic sufficient to hide the corresponding audio and/or video watermark. As used herein, the terms "code" or "watermark" are used interchangeably and are defined to mean any identification information (e.g., an identifier) that may be associated with media (e.g., a program or advertisement) for the purpose of identifying the media and/or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media. That is, while a single item of signature data may correspond to a fraction of a second of media (and, thus, unlikely sufficient to uniquely identify the media), as used herein a signature (or fingerprint) corresponds to a continuous stream of such individual items of signature data sufficiently long to identify the associated media relative to other media with a relatively high level of confidence. The particular length of such signatures may differ depending upon the nature of the media and/or the level of confidence desired.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that is matched with the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were disclosed in Thomas, U.S. Pat. No. 5,481,294, which is hereby incorporated by reference in its entirety.

While signatures or fingerprints are, by their nature, uniquely associated with the media programs they represent, their utility in actually identifying a particular media program depends on the existence of a corresponding reference signature to which collected signature data can be matched. Because of the rapid increase in media sources (e.g., cable television channels, satellite television, etc.), such reference signatures are sometimes unavailable for linear media that often includes new content (e.g., new episodes in a television series). Moreover, because signatures are unique to the media signal they represent, in the case of the same media being broadcast on different stations at the same time (e.g., a simulcast of a political debate, a news program, a press conference, etc.), signatures will not distinguish the source of tuned media from among the simulcasting sources. In such circumstances, signatures alone cannot adequately be relied on to identify media. Accordingly, there is a need to facilitate the identification of media, including new media programs, based on signature data collected from such media as it is accessed and/or presented.

In contrast to signatures, watermarks or codes embedded in linear media can be used to identify particular media programs. However, in the context of linear media, watermarks typically only include the time when media is accessed and/or presented and the corresponding source (e.g., station and/or channel). As such, the watermarks do not directly identify the media with which they are associated. Instead, the particular media being presented at the time in question is determined through a lookup in a media lineup table using the time and source information represented in and/or by the watermark. Thus, while watermarks can be used to uniquely identify media, the reliability of the identification depends upon the accuracy of the media lineup table. Accordingly, there is a need to enable the confirmation or verification of the accuracy of media lineup tables and/or to correct any inaccuracies.

Often, media monitoring entities generate a media lineup table based on program scheduling lineup information provided by media provider(s) and/or by a third party lineup data providers such as Tribune Media Services. Additionally or alternatively, in some examples, media monitoring entities may use lineup information collected from event information table (EIT) data to generate the media lineup table. EIT data is metadata transmitted with a media broadcast (e.g., provided by media providers) that contains a program schedule for the corresponding channel of the media from the current time to a set period of time into the future (e.g., the next nine hours). In some examples, the lineup information from these sources includes media identifiers (e.g., program titles, media identification numbers, etc.) for media programs scheduled to be presented on a particular channel and the times at which the media programs are scheduled to be presented. Lineup information (e.g., provided by media providers, other lineup data providers, and/or transmitted in EIT data) is typically set a period of time (e.g., up to a few days) in advance of the airing of the scheduled media programs such that any changes to the schedule within that period of time will not be indicated in the lineup information. There are circumstances that may cause shifts or changes in a scheduled media lineup that will not be indicated in the lineup information and/or will cause the lineup information to be inaccurate. For example, late breaking news, sporting events extending into overtime, emergency alert system messages, are typically unforeseen and/or unanticipated events that cannot be planned in advance and, thus, cannot be accounted for by published lineup information. Accordingly, identifying audience exposure to media at such times based on such lineup information may result in crediting the incorrect media program(s) with exposure, thereby undermining the reliability of resulting audience measurement metrics (e.g., ratings).

Example methods and apparatus overcome the above obstacles by generating a database of recurring segment reference signatures corresponding to recurring segments in multiple different episodes of a media series to identify the media as corresponding to an episode in the series. As used herein, a database refers to any form of data repository such as a database, flat files, a data store, etc. As used herein, a media series refers to any media that includes multiple different units of media content airing in separately designated timeslots, where each unit is associated with a common title. As used herein, an episode refers to one unit of a media series. Some example media series includes a scripted television series, a news show, a talk show, a game show, a multi-part documentary, etc. Typically, the episodes of a media series are scheduled to air on a recurring or periodic basis (e.g., every day, once a week, every weekday, etc.). However, episodes may be presented at times other than the main schedule (e.g., episode reruns may be aired at other times that may or may not be on a periodic schedule). In some examples, the subject matter of different episodes in a media series may be related (e.g., successive episodes develop a common narrative). In other examples, the subject matter of different episodes in the media series may be unrelated (e.g., evening news television). In some examples, episodes in different seasons correspond to different media series (e.g., season 1 is a first media series and season 2 is a second media series). In other examples, a media series may include multiple seasons. A media series may correspond to television media, radio media, online media, etc.

Example systems and methods disclosed herein collect reference signatures corresponding to recurring segments within multiple different episodes of the same media series. That is, the reference signatures uniquely identify the media series (rather than the particular episode) because each of the multiple different episodes contains the same segment(s) as the other episodes to which the reference signatures are associated. Such reference signatures are referred to herein as recurring segment reference signatures. For example, many media series have an intro sequence recurring in each episode in which a theme song is played, a title sequence is played, opening credits are provided, a title of the series is displayed and/or verbally announced (e.g., via a voice-over), and/or some other repetitive audio and/or visual sequence is provided. Likewise, the individual episodes in many media series share a common closing sequence such as, for example, the ending credits. Further, episodes of certain media series may also contain other recurring sequences (e.g., sequences that occur in more than one episode). While recurring segments cannot uniquely identify the individual episode of a media series, they can serve as the basis for signatures or fingerprints representative of the media series. That is, the recurring segments of audio and/or visual data can be used to uniquely identify the media series. Accordingly, as signature data is collected from monitored media and determined to match a recurring segment reference signature, the content of the media being monitored can be identified as corresponding to the media series to which the recurring segment reference signature belongs. This is possible even when the particular episode of the media series is not identifiable (e.g., a new episode that has not previously been aired).

In some examples, signature data collected from monitored media is timestamped to indicate when the media segment associated with an identified signature was presented. In some examples, such timing information is used to determine a start time and/or and end time of the media being presented (e.g., the start and end of the particular episode of the media series). In particular, in some examples, not only do different episodes of a media series have common segments recurring in each episode that can be identified, but the temporal placement of the recurring segments within each episode are typically at approximately the same time. For example, the intro sequence of an episode is typically at the beginning of each episode whereas the closing sequence (e.g., the end credits) is at the end of each episode. Thus, in some examples, when a signature corresponding to the intro sequence of a particular episode in a media series is detected, the media monitoring entity can determine the start time of the particular episode. Likewise, the timing of a signature corresponding to a closing sequence can be used to determine the end time of the particular episode. For some media series, each episode begins with a lead-in sequence or pre-credit scene (sometimes referred to as a cold open) that precedes the intro sequence (e.g., to attract and/or captivate an audience, to set the stage or preview the episode, to review previous episode(s), etc.). In such examples, the timing of the intro sequence does not directly correspond to the beginning of the episode. However, the pre-credit scene is often approximately the same duration for each episode such that the beginning of any particular episode can be determined from the time of the intro sequence by taking into account the duration of the pre-credit scene. Further, even if there is variation in the duration of the pre-credit scene across different episodes, the total length of each episode is typically of a fixed duration such that the beginning of a particular episode can be determined by projecting backward from the closing sequence of the episode, which is at the end of the episode.

Thus, based on signature data collected from a particular episode of a media series, examples disclosed herein can identify the media series and the corresponding start time and/or end time of the episode. Based on this information, in some examples, a media lineup table or programming schedule can be generated and/or verified. For example, the start time of an episode of a media series identified from collected signature data can be checked against lineup information obtained from a third party (e.g., media providers, other lineup data providers), and/or collected EIT data. If the start time of the episode based on the detected signature(s) matches the scheduled start time listed in the lineup information, then the lineup information is verified based on media data (e.g., the signature data) that actually aired on the corresponding channel and at the designated time. Accordingly, the lineup information can reliably be used in a media lineup table for reference when audience exposure data is collected from panelists (e.g., to tie extracted watermarks to particular media programs). On the other hand, if the start time of the episode based on the signature data is different than the lineup information (e.g., due to unanticipated delay of the media), the lineup information may be flagged as inaccurate and/or a media lineup table generated from such lineup information may be updated and/or corrected. In some examples, the identifying information and the timing information obtained via the signature data can be used to resolve discrepancies between different sources of the lineup information (e.g., data from a third party lineup provider as compared to collected EIT data). Additionally or alternatively, in some examples, the signature data may be used to generate a reference media lineup table independent of published lineup information. That is, in some examples, as the start and end time of an episode of media are determined from collected signature data, the corresponding media may be entered into a lineup table without referencing lineup information from other sources.

Further, in some examples, the lineup information may be flagged when the collected signature data does not included expected signatures. For example, an episode of a particular media series may have been scheduled (according to the lineup information) at a particular time but an analysis of the collected signature data over the same period fails to detect any signatures matching the recurring segment reference signatures associated with that media series. In such examples, the lineup information is flagged because a different program may have been scheduled and/or at least the recurring segments of the episode were cut (e.g., replaced by a late breaking news announcement). Thus, examples disclosed herein can confirm when media actually aired and/or did not actually air to improve the accuracy of published lineup information.

In some examples, the recurring segment reference signatures used to identify media series are generated by a one-time human classification of the recurring segments. For example, when a new media series is released an employee of the media monitoring entity (or third party entity) may view one or more episodes of the series to identify the intro sequence, the closing sequence, and/or any other common segments recurring across multiple different episodes of the media series. In this manner, the amount of time and expense to generate a reference database through which media can be identified (without reliance on looking up program schedules in potentially inaccurate published lineup information)

is significantly reduced compared with having humans view every single episode of every media series to classify each. Furthermore, in some examples, the creation of the reference signature database including the recurring segment reference signature is fully automated. In particular, in some examples, a computer processing system may analyze the media aired on a particular channel over an extend period of time (sufficient to include multiple different episodes of a media series on the channel) to detect recurring segments. In some such examples, the recurring segments are associated with lineup information provided by a media provider and/or a third party lineup data provider. Once the recurring segments are identified and associated with the corresponding media series, the signatures representative of the recurring segments are stored in a database and identified as recurring segment reference signatures. In some examples, other reference signatures (e.g., not recurring segment reference signatures) may also be stored in the database for other purposes (e.g., to identify commercials).

Once the recurring segments are identified and associated with recurring segment reference signatures, future episodes of the media series corresponding to such recurring segment reference signatures (e.g., new episodes in the series and/or reruns of old episodes) can be detected and identified automatically. Furthermore, in some examples, the recurring segment reference signatures are used to verify and/or update lineup information by detecting delays (e.g., time shifts) and/or other schedule changes to the media actually being broadcast relative to what is scheduled according the lineup information. As a result, looking up particular media to which panelists have been exposed based on such lineup information is much more reliable because it is independently verified based on what media actually aired at the corresponding time.

FIG. 1 illustrates an example system 100 that includes a media monitoring reference site 102 associated with and/or managed by a media monitoring entity 104, such as The Nielsen Company (US), LLC, to collect reference media data for use in implementing various audience measurement endeavors. In the illustrated example, the media monitoring reference site 102 is independent of any panel-based measurement that may also be occurring in or near the geographic location or area of the media monitoring reference site 102. Panel-based measurements involve the monitoring of exposure of registered panelists to media to determine audience measurement metrics (e.g., media ratings, advertising reach, etc.). That is, a media monitoring entity enrolls people that consent to being monitored into a panel. During enrollment, the media monitoring entity receives demographic information from the enrolling people so that subsequent correlations may be made between advertisement/media exposure to those panelists and different demographic markets.

In some examples, the media monitoring reference site 102 includes a receiver 106 (e.g., set-top boxes or the like) that receives media from a media provider 108 and transmits the media to a reference media data collector 110 for processing. The media provider 108 of FIG. 1 may be a multi-system operator such as a cable television provider. However, the media provider 108 may be any type of media provider capable of providing linear media (e.g., media provided on a set schedule over a period of time). In the illustrated example, the receiver 106 is tuned to a known (e.g., designated by the media monitoring entity 104) channel or station associated with the media provider 108. By designating the station or channel in this manner, the media monitoring entity 104 can collect reference data for the particular station or channel that can then be used to detect the media to which panelists are exposed (e.g., collected at a panel-based measurement site) to generate audience measurement metrics.

In the example of FIG. 1, the reference media data collector 110 generates signature data corresponding to signatures (fingerprints) representative of the audio and/or video from the media signals (e.g., audio and/or visual signals) collected via the receiver 106. In some examples, the reference media data collector 110 timestamps the signature data as the signature data is collected. The timestamps represent time(s) and/or date(s) at which the media signals were collected and/or the time(s) and/or date(s) when the media signals were aired. In some examples, the media signals are collected in substantially real-time to their being broadcast by the media provider 108 such that the timestamps are representative of the time(s) when the signature data media signals were actually broadcast by the media provider 108. Each item of signature data (e.g., each signature) may be associated with a timestamp. Additionally or alternatively, groups of the signature data (e.g., time-adjacent signatures) may be marked with a same timestamp. In some examples, the reference media data collector 110 generates and transmits reports and/or collected media data (e.g., the collected signature data, the timestamps, etc.) to a centralized reference media processing system 112 of the media monitoring entity 104.

In some examples, the media monitoring reference site 102 may include multiple receivers 106 tuned to different channels (associated with the same and/or different media provider(s) 108). In some such examples, each receiver may also have a corresponding reference media data collector 110. In other examples, a single reference media data collector 110 may collected and/or process the data from more than one receiver 106. Further, in some examples, there may be multiple media monitoring reference sites each with one or more receivers 106 and/or one or more reference media data collector 110. More particularly, in some examples, the media monitoring entity 104 may establish remote media monitoring sites at different geographic locations corresponding to regions where affiliated stations broadcast media for the region (e.g., local television programming, local radio programming, etc.). For purposes of clarity, in the illustrated example, only one media monitoring reference site 102 is shown containing only one receiver 106 tuned to a particular station or channel associated with one media provider 108. Systems for collecting reference signatures are known from, for example, Thomas, U.S. Pat. No. 5,481,294. In Thomas, scanning receivers are used to repeatedly tune to different channels and collect signatures. Such an approach may be employed in the example of FIG. 1.

Further, in some examples, the media monitoring reference site 102 includes a media recorder 114 to continuously record the media being presented on the particular channel to which the receiver 106 is tuned over an extended period of time (e.g., one year). In this manner, the media monitoring entity 104 can generate a reference library of all media actually presented on the channel for reference as the need may arise (e.g., to resolve discrepancies of lineup information, to detect and/or analyze the placement and/or repetition of commercial advertisements in the media, as a reference source to compare against signatures collected at panelist sites in order to identify media tuned at those sites, etc.). In some examples, the media recorder 114 is in communication with the reference media processing system 112 to transmit the recorded media and/or provide access to the media stored locally at the media monitoring reference site 102. In some examples, the media recorder 114 may be at a different geographic location (e.g., Chicago, Ill. and Tampa, Fla.) than the reference media data collector 110 (e.g., the media recorder 114 and the reference media data collector 110 may be implemented at different media monitoring reference sties 102).

In the illustrated example of FIG. 1, the reference media processing system 112 generates a database of reference signatures based on the media data collected by the reference media data collector 110. In some examples, the reference signatures include recurring segment reference signatures corresponding to different episodes of one or more media series scheduled to air on the channel being monitored. More particularly, in some examples, the reference media processing system 112 analyzes the media over a period of time sufficiently long to include at least two episodes of a media series scheduled to air on the particular channel or station being monitored. For example, many television series have episodes that are scheduled once a week such that the reference media processing system 112 may analyze the media aired over a two week period of time. In some examples, the reference media processing system 112 analyzes the media to detect segments that repeat in the media during the period being analyzed. In some such examples, the repeating segments that are associated with recurring portions of different episodes of a media series are identified as a basis for recurring segment reference signatures. For example, over the course of a two week period there are likely to be many commercial advertisements that repeat multiple times. In some examples, commercial advertisements are not associated with recurring portions of different episodes of a media series and, therefore, are excluded from consideration as recurring segment reference signatures. By contrast, the reference media processing system 112 may identify an intro sequence and/or a closing sequence recurring in different episodes of a media series. In such examples, the signature data corresponding to the segments or portions of the episodes that are recurring are used to generate recurring segment reference signatures (e.g., by flagging the reference signatures from such signature data as recurring segment reference signatures) that may be used to reliably identify the media series when any particular episode in the series is aired. While signature data corresponding to commercials may not be identified (e.g., flagged) as recurring segment reference signatures, in some examples, the corresponding signatures collected by the reference media data collector 110 may be separately identified (e.g., separately flagged) as commercial reference signatures.

Further, in some examples, information associated with the temporal placement of the recurring segment reference signatures within each episode is associated with the recurring segment reference signatures. For example, the recurring segment reference signature for an intro sequence may be associated with information indicating the intro sequence begins approximately 2 minutes after the start time of the episode. In this manner, not only can the recurring segment reference signature be used to identify a media series being aired when matched with collected signature data, but the approximate start time of the episode of the media series can also be determined. In some examples, the reference media processing system 112 analyzes the media as it is collected by the reference media data collector 110 in substantially real-time. In other examples, the reference media processing system 112 may analyze the media at a later time based on the recording of the media by the media recorder 114 and/or based on signature data collected in substantially real-time that is subsequently analyzed. Example methods and apparatus to generate a database of recurring segment reference signatures are described in more detail below.

Further, in some examples, the reference media processing system 112 obtains lineup information from the media provider 108 (e.g., directly and/or based on EIT data transmitted with the media) and/or from a third party lineup data provider 116 (e.g., TV Guide®). The lineup information may be obtained over the Internet, via email, or using any other type of vehicle for transferring data. In some examples, the reference media processing system 112 uses the lineup information to generate a media lineup table for use in generating audience ratings and/or other audience measurement metrics (e.g., by looking up particular media to which panelists are exposed based on watermarks collected from media). In some examples, the media lineup table corresponds to the programming schedule for the particular channel or station being monitored by the media monitoring reference site 102. In some examples, the media lineup table corresponds to multiple channels or stations (associated with one or more media providers 108) being monitored from one or more media monitoring reference sites 102.

In some examples, the reference media processing system 112 verifies and/or corrects the lineup information and/or the corresponding media lineup table. More particularly, in some examples, as the reference media data collector 110 monitors media on the channel or station of the receiver 106, the particular media series being aired may be identified by matching collected signature data to the recurring segment reference signatures. In some examples, the media series identified at the time the signature data is collected is compared to the programming schedule provided in the media lineup table (based on the lineup information). If the media series actually being aired at a given point in time (as identified by the collected signature data) corresponds to the media series in the media lineup table, then the lineup information is confirmed or verified. However, if the media series identified based on the collected signature data does not match the lineup information (and/or does not match the scheduled time), then an error in the lineup information is detected. In some examples, the reference media processing system 112 flags the error or discrepancy for further review. In some examples, the reference media processing system 112 corrects and/or updates the media lineup table based on the media series detected as actually airing on the particular station or channel at the corresponding time. In some examples, the reference media processing system 112 generates a media lineup table based on the collected signature data and the recurring segment reference signatures without referencing or comparing the lineup information obtained from other sources. Example methods and apparatus to verify, correct, and/or generate a media lineup table are described in more detail below.

Figure 2:
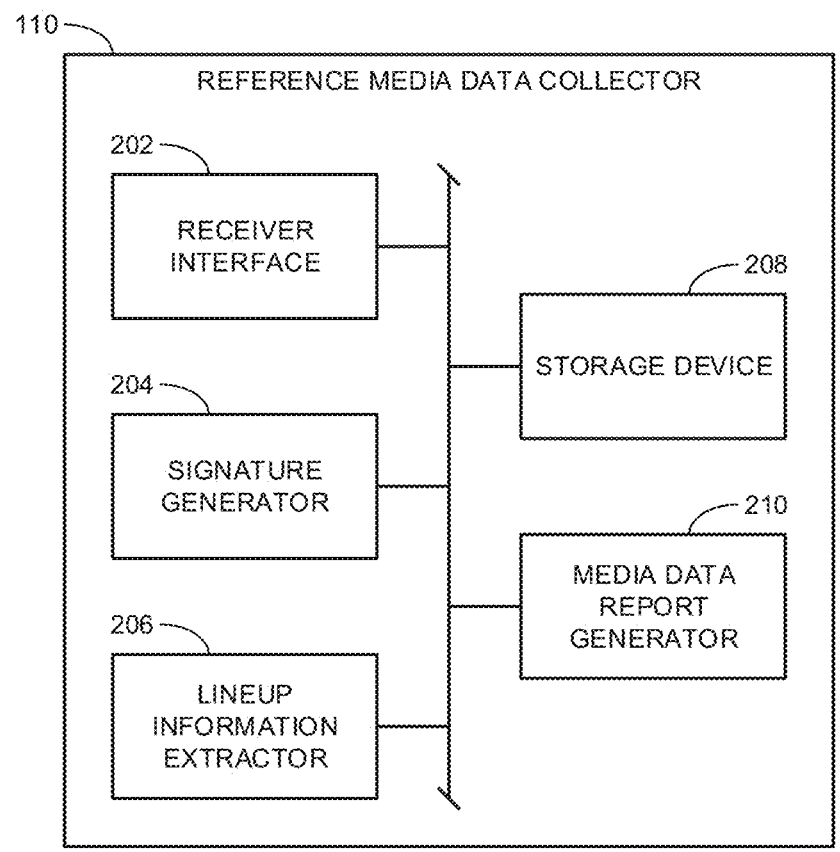
FIG. 2 is a block diagram of an example implementation of the example reference media data collector of FIG. 1.

FIG. 2 is a block diagram of an example implementation of the example reference media data collector 110 of FIG. 1. The example reference media data collector 110 of FIG. 2 includes an example receiver interface 202, an example signature generator 204, an example lineup information extractor 206, an example storage device 208, and an example media data report generator 210.

The example receiver interface 202 of FIG. 2 receives media signals and/or data from the example receiver 106 of FIG. 1. The example media signals and/or data may include audio signals (e.g., analog audio recorded via a microphone), video signals (e.g., analog video recorded via an image sensor or received from a video line out connection), and/or digital data versions (e.g., digital samples) of audio and/or video (e.g., digitized audio, digitized video). Additionally, in some examples, the media signals and/or data may include metadata transmitted with the media such as, for example EIT data providing a scheduled lineup for the channel being monitored for a most recent upcoming period of time.

In the illustrated example, the example signature generator 204 of FIG. 2 generates signatures or fingerprints of the media signals and/or data received via the receiver interface 202. For example, the signature generator 204 may generate signatures of overlapping blocks of audio (and/or video) received via the receiver interface 202 to characterize the audio (and/or video) presented on the channel being monitored during a time period. Example methods and apparatus to implement the example signature generator 204 are described in U.S. Pat. No. 4,677,466 issued on Jun. 30, 1987; U.S. Pat. No. 5,481,294 issued on Jan. 2, 1996; U.S. Pat. No. 7,460,684 issued on Dec. 2, 2008; U.S. Pat. No. 8,457,972 issued on Jun. 4, 2013, U.S. Pat. No. 8,600,531 issued on Dec. 3, 2013, U.S. Patent Application Publication No. 2005/0232411 published on Oct. 20, 2005; U.S. Patent Application Publication No. 2006/0153296 published on Jul. 13, 2006; U.S. Patent Application Publication No. 2006/0184961 published on Aug. 17, 2006; U.S. Patent Application Publication No. 2006/0195861 published on Aug. 31, 2006; U.S. Patent Application Publication No. 2007/0274537 published on Nov. 29, 2007; U.S. Patent Application Publication No. 2008/0091288 published on Apr. 17, 2008; U.S. Patent Application Publication No. 2008/0276265 published on Nov. 6, 2008,U.S. Patent Application Publication No. 2013/0261781 published on Oct. 3, 2013, and U.S. Patent Application Publication No. 2014/0088742 published on Mar. 27, 2014, all of which are hereby incorporated by reference in their entireties.

In the illustrated example of FIG. 2, the signature generator 204 provides the generated signatures to the example storage device 208 for storage and/or provides the signatures to the media data report generator 210. In some examples, the signature generator 204 associates (e.g., tags/timestamps) each generated signature with a timestamp indicative of the time and date at which the fingerprinted media was received by the receiver interface 202. The combination of a signature with associated timestamp information is referred to herein as signature data. Signature data may include one or more signatures and their respective time stamps.

In the illustrated example of FIG. 2, the reference media data collector 110 includes the example lineup information extractor 206 to extract EIT data from the media signal. In some examples, the lineup information extractor 206 stores the lineup information from the EIT data in the example storage device 208 and/or provides the lineup information to the media data report generator 210.

In the illustrated example of FIG. 2, the reference media data collector 110 includes the example media data report generator 210 to generate and transmit a report to the example reference media processing system 112 of FIG. 1. In the example of FIGS. 1 and 2, the report includes the signatures generated by the signature generator 204 and/or the lineup information obtained from the EIT data collected by the lineup information extractor 206. In some examples, the report includes timestamps associated with the collected signatures. The report transmitted to the example reference media processing system 112 may be combined and/or aggregated with similar reports from other reference media data collectors monitoring media via receivers tuned to other channels. In this manner, a reference database (e.g., the reference database 308) associated with the reference media processing system 112 may be populated with signature data corresponding to different channels. In some examples, the signature data stored in such a reference database is then analyzed to identify (e.g., flag) recurring segment reference signatures as described more fully below. Additionally, in some examples, once the recurring segment reference signatures are identified, signature data collected and transmitted in subsequent reports may be compared with the recurring segment reference signatures to identify the media series from which the signature data is collected. In this manner, the media actually airing on the channel(s) being monitored can be reliably determined in substantially real-time and compared with previously obtained lineup information for the same time period to verify and/or correct an associated media lineup table.

While an example manner of implementing the reference media data collector 110 of FIG. 1 is illustrated in FIG. 2, one or more of the elements, processes and/or devices illustrated in FIG. 2 may be combined, divided, re-arranged, omitted, eliminated and/or implemented in any other way. Further, the example receiver interface 202, the example signature generator 204, the example lineup information extractor 206, the example storage device 208, the example media data report generator 210, and/or, more generally, the example reference media data collector 110 of FIG. 2 may be implemented by hardware, software, firmware and/or any combination of hardware, software and/or firmware. Thus, for example, any of the example receiver interface 202, the example signature generator 204, the example lineup information extractor 206, the example storage device 208, the example media data report generator 210, and/or, more generally, the example reference media data collector 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, receiver interface 202, the example signature generator 204, the example lineup information extractor 206, the example storage device 208, and/or the example media data report generator 210 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference media data collector 110 of FIG. 1 may include one or more elements, processes and/or devices in addition to, or instead of, those illustrated in FIG. 2, and/or may include more than one of any or all of the illustrated elements, processes and devices.

Figure 3:
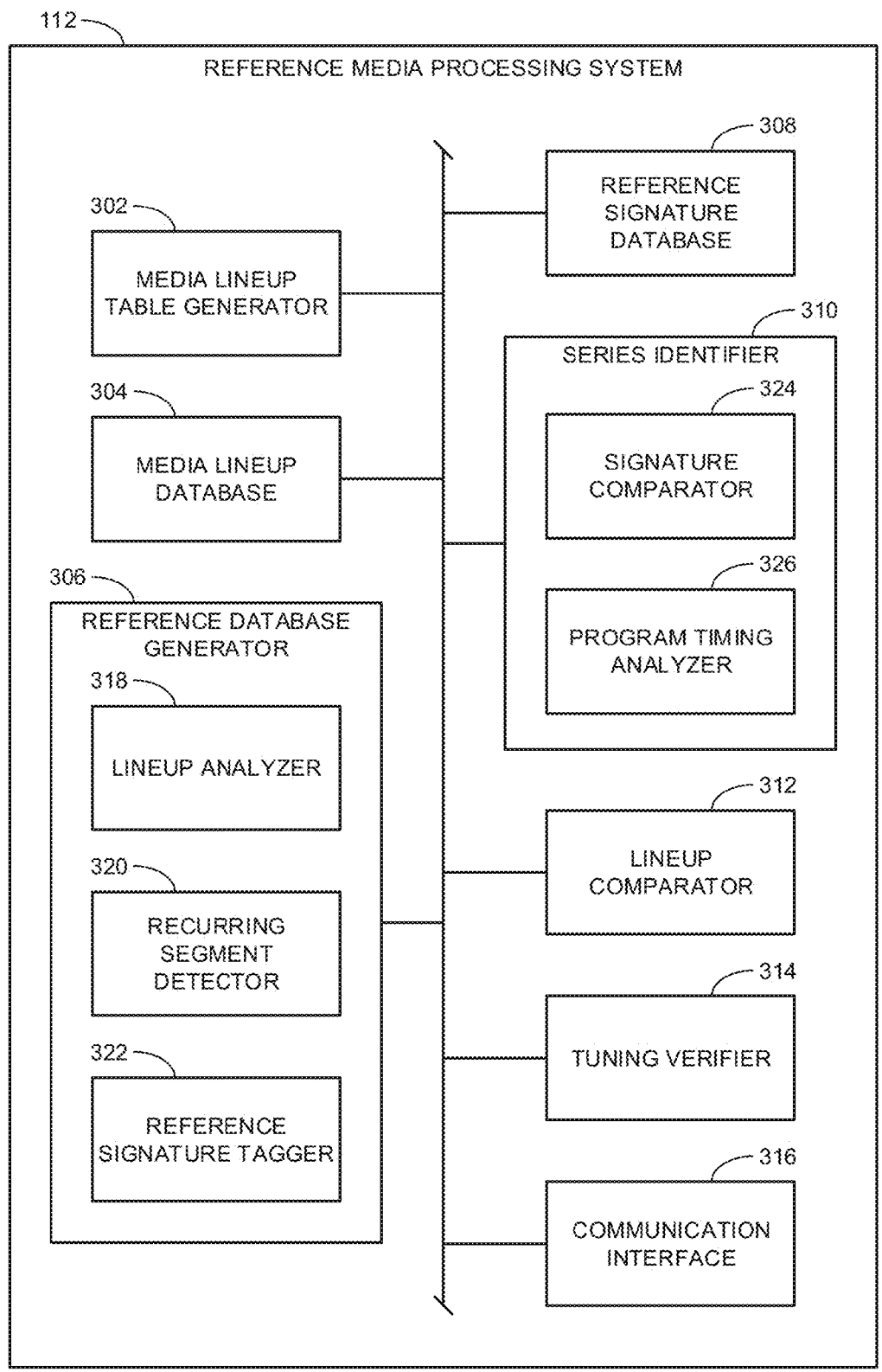
FIG. 3 is a block diagram of an example implementation of the example reference media processing system of FIG. 1.

FIG. 3 is a block diagram of an example implementation of the example reference media processing system 112 of FIG. 1. The example reference media processing system 112 of FIG. 3 includes an example media lineup table generator 302, an example media lineup database 304, an example reference database generator 306, an example reference signature database 308, an example media series identifier 310, an example lineup comparator 312, an example tuning verifier 314, and an example communication interface 316.

In the illustrated example of FIG. 3, the reference media processing system 112 is provided with the media lineup table generator 302 to receive and/or access lineup information provided by the media provider 108 and/or the lineup data provider 116. Based on the lineup information, the example media lineup table generator 302 generates a media lineup table representative of the timing, ordering, and/or scheduling of programs on the channel being monitored by the reference media data collector 110. In some examples, the media lineup table generator 302 combines lineup information corresponding to multiple channels (e.g., associated with the media provider 108 and/or other media providers) being monitored by multiple reference media data collectors 110 (e.g., at one or more media monitoring reference sites 102). In the illustrated example, the generated media lineup table is stored in the media lineup database 304 for subsequent reference.

In the illustrated example of FIG. 3, the reference media processing system 112 is provided with the example reference database generator 306 to designate recurring segment reference signatures to be stored in the reference signature database 308. In the illustrated example, the recurring segment reference signatures correspond to recurring segments of multiple different episodes of a media series. While such recurring segment reference signatures cannot be used to uniquely identify a particular episode because the reference signatures recur across multiple different episodes, detecting one such recurring segment signature can be used to identify the media series to which all of the episodes having the recurring segment belong. As shown in the illustrated example, the reference database generator 306 includes an example lineup analyzer 318, an example recurring segment detector 320, and an example reference signature tagger 322.

The example lineup analyzer 318 of FIG. 3 receives or accesses the lineup information from the media provider 108 and/or the lineup data provider 116. In some examples, the lineup analyzer 318 accesses the lineup information as stored in the media lineup table in the media lineup database 304. The lineup information in the illustrated example of FIG. 3 includes the schedule or lineup of media on the channel being monitored. In some examples, the lineup analyzer 318 determines program schedule information based on the lineup information. More particularly, in some examples, the lineup information includes media identifying information and media presentation scheduling information. In some examples, the media identifying information includes a set of media identifiers (e.g., identifiers of programs) for media presented on the channel monitored at the media monitoring reference site 102. The media identifiers may include titles of media (e.g., titles of media series), episode names of media, episode numbers of media, season numbers of media series, unique media identification numbers, and/or any other type of media identifier. In some examples, the media presentation scheduling information includes designated times (e.g., designated time slots, such as ½ hour time slots) and/or designated time ranges (e.g., defined using start times, end times, and/or durations) corresponding to the ordering or scheduling of the media being presented over the monitored channel.

In some examples, based on an analysis of the lineup information, the example lineup analyzer 318 identifies multiple different episodes of a particular media series for the recurring segment detector 320 to analyze. In some examples, the recurring segment detector 320 compares the media signals and/or the signatures representative of the media signals that aired on the channel at the designated times associated with the different episodes of the same media series. Through this comparison, the example recurring segment detector 320 identifies one or more segment(s) and/or corresponding signatures in the different episodes that match. That is, the identified segment(s) appear in each of the different episodes compared. The signatures of these matching segments are then designated as "recurring segment reference signatures" by, for example, setting a flag stored in association with each such signature. Additionally or alternatively, in some examples, the recurring segment reference signatures may be stored in a separate database containing exclusively such recurring segment reference signatures.

Typically, the recurring segments will correspond to an intro sequence (e.g., title sequence, opening credits, etc.), and/or a closing sequence (e.g., closing credits). However, the recurring segments may correspond to other portions of the episodes at any other time during the duration of the episodes such as an intro to a particular section of the episode (e.g., intro to a sports news section of a news program, transition sequence into a final round of a game show, a return from a commercial break that is always accompanied by a sound, song, image, or the like, etc.). However, in some examples, recurring segments may be detected in multiple different episodes that do not occur in other episodes of the same media series and, thus, are not truly representative of a segment that can be relied upon to identify the series. For example, a subset of multiple episodes in a series may include short transitional scenes (sometimes referred to as establishing shots) that give context for following scenes that occur in a particular setting of each episode in the subset of episodes. However, other episodes may not include content associated with the particular setting and, therefore, do not include the particular transitional scene present in the subset of episodes. Accordingly, in some examples, the recurring segment detector 320 may exclude recurring segments that have a duration less than a threshold period of time (e.g., less than ten seconds) by, for example, not flagging their respective signature as a recurring segment reference signature.

Often, the same commercial advertisement will be aired during multiple different episodes of the same media series. The recurring segment detector 320 may identify this commercial as recurring segments of such episodes. However, the same commercial advertisement will also typically air at other times during other media not corresponding to the episodes of the media series. Accordingly, in some examples, the recurring segment detector 320 compares recurring segments during different episodes of a particular media series to recurring segments detected during other series. If the recurring segment is present in more than one media series, it is not unique to the series and the recurring segment detector may exclude the segment signatures from the set of recurring segment reference signatures by, for example, not setting the flag in association with those signatures. In some examples, rather than deleting commercials based on their recurrence in connection with different programs, the reference media processing system includes a commercial detector which looks for, for example, blank frames, sound pops, or other artifacts associated with commercial breaks to identify reference signatures or commercial reference signatures. Example methods and apparatus to detect commercials are described in U.S. Pat. No. 8,819,717 issued on Aug. 26, 2014 and U.S. Patent Application Publication No. 2011/0292291 published on Dec. 1, 2011, both of which are incorporated by reference in their entireties.

Additionally, the temporal placement of many recurring segments relative to a reference point of each episode (e.g., a start time) will be approximately consistent (e.g., the intro sequence is near the beginning and the closing sequence is near the end). Accordingly, in some examples, the recurring segment detector 320 may compare the timing of a particular segment relative to the reference point (e.g., a start time) of an episode to verify whether the segment actually corresponds to the temporal placement of the same segment detected in a different episode. In some examples, if the temporal placement of a recurring segment is not consistent (within a certain threshold) across different episodes, the recurring segment detector 320 may identify the segment as requiring further verification (e.g., by comparing to additional episodes, manually comparing the segments, etc.) before designating its signature as a recurring segment reference signature, or not doing so. In some examples, recurring segments that do not have a substantially consistent temporal placement (e.g., less than ten minutes of variation) within different episodes are automatically excluded from the set of recurring segment reference signatures.

In some examples, the recurring segment(s) are identified based on a match of the audio signal of the media regardless of whether there is corresponding video data that matches during the corresponding segment(s). For example, a television series may have a unique theme song that is played during the intro sequence to each episode, but the video played during the intro sequence may be different. Likewise, in some examples, the recurring segment(s) are identified based on matching video signals independent of the audio (e.g., the visual frames of the intro sequence of each episode may be identical but the audio may differ). In some other examples, the recurring segment(s) are identified when both the audio and video match across different episodes. Further, in some examples, the recurring segment(s) are identified based on portions of the audio and/or video matching. For example, an intro sequence may include episode-specific video. However, that episode-specific video may be overlaid with a logo, text, or other visual feature that is present in multiple different episodes. In such examples, the recurring segment(s) are identified based on the recurring logo, text, or other visual feature.

In some examples, the recurring segment detector 320 compares the media signals associated with the different episodes to be compared over a duration that begins a period of time (e.g., a half hour, a full hour, etc.) before the scheduled start times of the different episodes and extends a period of time (e.g., a half hour, a full hour, etc.) after the scheduled end times of the different episodes. In this manner, there is an increased likelihood that any inaccuracies in the lineup information (e.g., due to a shift in the actually airing time of one of the episodes) may be accounted for and ensure the full duration of the different episodes are compared.

In some examples, recurring segment detector 320 analyzes the media signals on a particular channel for an extended period of time without regard to what was scheduled at any specific time as indicated in the lineup information. In such examples, the recurring segment detector 320 identifies any repeating or recurring segments over the period of interest and then looks up the corresponding media that was airing at the time each recurring segment was detected. In this manner, the recurring segments can be associated with particular media series. Many media series are scheduled to air at a consistent time at least once per week. Accordingly, in some examples, the period of time analyzed by the recurring segment detector 320 is more than one week (e.g., eight days, two weeks, etc.) such that the period includes at least two different episodes of media series. In this manner, any segment(s) recurring in different episodes of the same media series can be detected by the recurring segment detector 320. In some examples, longer periods of time are analyzed that include more than two episodes of each media series on the channel or station being monitored to increase the reliability of the recurring segment detection and eliminate false positives.

In the illustrated example of FIG. 3, the example reference database generator 306 includes the example reference signature tagger 322 to designate, flag, or tag appropriate portions of the signature data received from the reference media data collector 110 as corresponding to recurring segments and store the flagged or tagged portions of the signature data as recurring segment reference signatures in the reference signature database 308. That is, all reference signatures, even those that are not flagged as recurring segment reference signatures, are stored in database 308 in the illustrated example. In some examples, the reference signature tagger 322 associates (e.g., tags) each recurring segment reference signature with media identifying information corresponding to the media series associated with the recurring segment (e.g., based on the lineup information). In some examples, the media identifying information includes a title of the media series. In some examples, the media identifying information includes a season number of the media series because the same recurring segments may not span multiple seasons (e.g., many media series develop new intro sequences for each season). In some examples, the reference signature tagger 322 associates (e.g., tags) each recurring segment reference signature with information indicative of the temporal placement of the corresponding recurring segment in the episode relative to a reference point (e.g., a start time) of the episode. Additionally or alternatively, in some examples, the reference signature tagger 322 associates each recurring segment reference signature with other information such as, for example, an indication of whether there is variation (and/or how much) in the temporal placement of the recurring segment between different episodes. In some examples, the initial designation of recurring segment reference signatures and/or their association with the media identifying information and/or the temporal placement information is manual reviewed to reduce (e.g., avoid) reliance on the lineup information, which may be inaccurate, and to confirm the associated information is otherwise accurate.

In some examples, once the reference database generator 306 designates relevant portions of the signature data returned by the reference media data collector 110 (e.g., based on the signatures stored in the reference signature database 308) as recurring segment reference signatures, the example series identifier 310 of FIG. 3 can identify the media series from which subsequent signature data is collected. In some examples, the series identifier 310 also identifies the timing of the airing of the particular episode of the media series (e.g., the start time and/or end time). In the illustrated example of FIG. 3, the series identifier 310 includes a signature comparator 324 and a program timing analyzer 326.

In some examples, the signature comparator 324 compares collected signature data (from the reference media data collector 110) to the recurring segment reference signatures (previously identified by the reference database generator 306 based on previously collected signature data). Based on such matching of the signature data to recurring segment reference signatures, the signature comparator 324 identifies the media series from which the signature data was collected. The example signature comparator 324 identifies the media series rather than the particular episode because the matched reference signatures (i.e., the recurring segment reference signatures) are episode-generic as corresponding to recurring segments across the multiple different episodes of the media series. In the illustrated example, the program timing analyzer 326 analyzes the temporal placement information associated with the recurring segment reference signatures against the timestamps associated with the newly collected signature data to determine the actual timing of the airing of the episode of the media series from which the signatures (e.g., associated with the newly collected signature data) were collected. For example, recurring segment reference signature temporal placement information for an intro sequence of episodes in a particular media series may indicate that the intro sequence has a temporal placement 4 minutes after the actual start time of each episode (e.g., on account of a commercial break and/or a pre-credit scene before the intro sequence). Thus, if a collected signature corresponding to the intro sequence indicates, via an associated timestamp, that the signature was collected at 6:04 pm, the example program timing analyzer may determine the episode being monitored had a start time of 6:00 pm.

In some examples, the temporal placement of the intro sequence may change from one episode to another because of different durations of a pre-credit scene. Accordingly, in some examples, the program timing analyzer 326 determines the start time of the media based on the temporal placement of the closing sequence in each of the episodes, which is likely to be consistent across all episodes such that each episode will fit in the fixed time slot designated for the media series. While there may be some difference in length between different episodes, the difference will likely be relatively small (e.g., less than two minutes) such that the start time of each episode can be approximated relatively accurately. Further, in some examples, the program timing analyzer 326 determines an approximate duration of the episode based on the temporal distance between the intro sequence and the closing sequence. While the above examples describe the program timing analyzer 326 determining program scheduling based on the start time of the detected episodes of a media series, the program timing analyzer 326 may additionally or alternatively determine program scheduling based on the end time of the media and/or based on any other suitable reference timeframe. By determining the actual time of airing for a particular episode of a media series, the accuracy of the previously obtained lineup information can be verified and/or any inaccuracy detected (e.g., due to unscheduled shifts in broadcast timing due, for example, overtime of a sporting event, late breaking news, etc.).

In some examples, an unforeseen or unanticipated media event may cut into rather than shift later scheduled programming such that a beginning portion of an episode of particular media may not be aired. In some such examples, the closing sequence of following media may end at the previously scheduled time (e.g., as indicated in the lineup information) while the beginning portion (including the intro sequence) of the media is cut. Accordingly, in some examples, the program timing analyzer 326 determines the actually timing of the episode based on both the intro sequence and the closing sequence. In some such examples, if no intro sequence was detected, the program timing analyzer 326 may flag the media as potentially including a segment cut from airing. Likewise, the program timing analyzer 326 may flag the media as potentially including a segment cut from airing if the closing sequence was not detected after an intro sequence was detected. In some examples, the program timing analyzer 326 may flag the media at the point in time where the undetected sequence was expected based on the known temporal distance between the intro sequence and the closing sequence to facilitate a manual review of the flagged media. In some examples, an entire episode of a media series scheduled for airing in the lineup information may not air. In such examples, none of the signature data collected for the channel would match the recurring segment reference signatures corresponding to the media series. In some such examples, the absence of any such signatures may serve as a basis to flag the media and/or the lineup information (e.g., the media lineup table) as inconsistent and/or requiring further analysis.

In the illustrated example, the lineup comparator 312 compares the lineup information (e.g., in the media lineup table stored in the media lineup database 304) with what was actually aired based on the identifying and timing information associated with the media series determined from the collected signatures and the recurring segment reference signatures. In this manner, the example lineup comparator 312 either verifies the lineup information is correct or detects discrepancies that may need correcting. In some examples, the lineup comparator 312 determines that the lineup information is inaccurate if either or both of the identified media series or the start time of the particular episode of the media series being aired does not match the media as scheduled in the lineup information. In some examples, the lineup information may identify the correct media series but the wrong schedule because, for example, a previous media program was extended (e.g., sporting event going into overtime) causing the media series to be bumped or shifted to a later time. In some such examples, the lineup comparator may flag the discrepancy (e.g., the offset of time) for a manual review to confirm the discrepancy and/or the cause of such. In some examples, the lineup comparator 312 may identify the discrepancy and provide the timing information of the actual airing of the media to the media lineup table generator 302 to automatically correct and/or update the media lineup table. In some examples, where either the intro sequence or the closing sequence of a particular media series was not detected, the lineup comparator 312 may nevertheless compare the timing of the detected sequence to the lineup information to determine whether the portion that was detected was at the scheduled time or changed.

In some examples, none of the signature data may match the recurring segment reference signatures, thus, indicating that some other media was aired (e.g., transmitted) during the scheduled timeslot. In some such examples, the other media may be identified in the same manner as described above to resolve the inconsistency with the lineup information. In other examples, the other media may be a special one-time program (or other program for which there are no corresponding recurring segment reference signatures) that cannot be identified. In some such examples, the absence of any detected recurring segments during the duration of the media may be flagged to indicate the lineup information is inconsistent and to allow for manual review to confirm the inconsistency and/or to determine what the other media was that aired during the timeslot.

The operation of the example media series identifier 310 and the example lineup comparator 312 is illustrated by the following. Episodes of a particular media series scheduled to air Monday evenings from 10:00-10:30 pm may include a 23 second intro sequence that is temporally placed approximately 4 minutes after the scheduled start time (e.g., 10:04:00 pm) due to a pre-credit scene before the intro sequence. Further, the episodes may include a 42 second closing sequence that appears approximately 27 minutes and 18 seconds (e.g., ending at 10:28:00 pm), thereby leaving the last two minutes of the slotted half hour program for a commercial break. On a particular Monday evening, the example signature comparator 324 may identify signatures collected by the reference media data collector 110 as matching recurring segment reference signatures corresponding to the above-mentioned intro and closing sequences of the particular media series. In this manner, the example signature comparator 324 identifies the particular episode airing as corresponding to the particular media series associated with the recurring segment reference signatures.

However, the timestamp associated with the collected signature corresponding to the intro sequence may indicate the signature was detected at 10:08:14 pm on the particular Monday. In some examples, the program timing analyzer 326 may subtract the expected temporal placement of the intro sequence (4 minutes after the start time) from the time indicated by the timestamp associated with the signature to calculate a start time for the particular episode being monitored. Based on the above example, the program timing analyzer 326 may determine the episode had a start time at approximately 10:04:14 pm. Thus, the example lineup comparator 312 may identify a delay of 4 minutes and 14 seconds relative to the scheduled start time of 10:00 pm. In some examples, this delay may be due to a change in the length of a pre-credit scene before the intro sequence. Accordingly, in some examples, the program timing analyzer 326 also determines the start time of the particular episode based on the timestamp of the signature corresponding to the closing sequence.

If the timestamp of the signature corresponding to the closing sequence indicates that the signature was collected at 10:27:18 pm (the same time as expected from the temporal placement information associated with the recurring segment reference signatures), the example program timing analyzer 326 may ignore the calculated start time based on the intro sequence and designate the start time as 10:00 pm based on the timing of the closing sequence. If, however, the signature data for the closing sequence was timestamped at 10:31:32 pm (the same 4 minutes and 14 second delay as the intro sequence), the program timing analyzer 326 may designate the start time of the particular episode of the media series at 10:04:14 pm.

With the media series identified and the start time determined, the example lineup comparator 312 compares the identified media and start time to the lineup information. In this particular example, the identified media matches the media scheduled to be aired. However, in the example where the start time was determined as occurring at 10:04:14 pm, the lineup comparator 312 identifies a discrepancy (e.g., a delay) of 4 minutes and 14 seconds. As such, in some examples, the lineup comparator 312 flags the lineup information as stored in the media lineup table for further review (e.g., by a human) and/or automatic correction (e.g., by the media lineup table generator 302). It is unlikely that the timing of the intro and closing sequences will occur at exactly the same temporal position of each episode of a media series. Similarly, it is unlikely that the temporal distance between the intro and closing sequences will be exactly consistent for each episode (e.g., it is unlikely a delay of the intro sequence will be identical to a delay of the closing sequence as in the above example). Accordingly, in some examples, the program timing analyzer 326 ignores the difference between the timing of media programs determined by the program timing analyzer 326 and the schedule designated by the lineup information when the difference is below a certain threshold (e.g., one minute, two minutes, etc.). In the above example, where the discrepancy exceeds three minutes and the calculated program timing indicates the closing sequence actually extends into the next time slot (ends after 10:30 pm), the lineup comparator 312 may flag the discrepancy.

In the illustrated example of FIG. 3, the example tuning verifier 314 is provided to verify the channel or station to which the receiver 106 of the media monitoring reference site 102 is tuned. For example, as described above, the signature data collected by the reference media data collector 110 from a receiver 106 tuned to a known channel or station (e.g., as set by the media monitoring entity 104). Accordingly, there is typically little concern about the source of the media being monitored. However, there may be situations where the receiver 106 may unintentionally be tuned (e.g., automatically reset) to a different channel or station other than the one to which the lineup information has been obtained and is to be verified (corresponding to the channel designated by the media monitoring entity 104 for the receiver 106). In some such examples, the tuning verifier 314 may compare a network associated with the media identified by the collected signature data to the network associated with the lineup information being analyzed. If there is a discrepancy, an alert may be generated to inform personnel of the media monitoring entity 104 that the receiver 106 is mistuned. For example, many television programs are typically only aired on the network providing the television programs (at least until the programs enter syndication). Thus, if the example tuning verifier 314 detects a show that is exclusively shown on ABC based on signature data collected from a receiver 106 that is supposed to be tuned to a channel associated with NBC, the example tuning verifier 314 may generate and transmit an alert indicating the receiver 106 is tuned to the wrong station or channel.

In the illustrated example of FIG. 3, the example communication interface 316 is provided to communicate error flagged lineup information and/or media data to personnel of the media monitoring entity 104 to manually review the error flagged data. In some examples, the communication interface 316 receives feedback in response to such a manual review. Further, in some examples, the communication interface 316 communicates alerts to the personnel when the tuning verifier 314 detects a receiver 106 is tuned to the wrong station.

While an example manner of implementing the reference media processing system 112 of FIG. 1 is illustrated in FIG. 3, one or more of the elements, processes and/or devices illustrated in FIG. 3 may be combined, divided, re-arranged, omitted, eliminated and/or implemented in any other way. Further, the example media lineup table generator 302, the example media lineup database 304, the example reference database generator 306, the example reference signature database 308, the example media series identifier 310, the example lineup comparator 312, the example tuning verifier 314, the example, communication interface 316, the example lineup analyzer 318, the example recurring segment detector 320, the example reference signature tagger 322, the example signature comparator 324, the example program timing analyzer 326, and/or, more generally, the example reference media processing system 112 of FIG. 3 may be implemented by hardware, software, firmware and/or any combination of hardware, software and/or firmware. Thus, for example, any of the example media lineup table generator 302, the example media lineup database 304, the example reference database generator 306, the example reference signature database 308, the example media series identifier 310, the example lineup comparator 312, the example tuning verifier 314, the example, communication interface 316, the example lineup analyzer 318, the example recurring segment detector 320, the example reference signature tagger 322, the example signature comparator 324, the example program timing analyzer 326, and/or, more generally, the example reference media processing system 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media lineup table generator 302, the example media lineup database 304, the example reference database generator 306, the example reference signature database 308, the example media series identifier 310, the example lineup comparator 312, the example tuning verifier 314, the example, communication interface 316, the example lineup analyzer 318, the example recurring segment detector 320, the example reference signature tagger 322, the example signature comparator 324, and/or the example program timing analyzer 326 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference media processing system 112 of FIG. 1 may include one or more elements, processes and/or devices in addition to, or instead of, those illustrated in FIG. 3, and/or may include more than one of any or all of the illustrated elements, processes and devices.

As described above, in some examples, the reference media processing system 112 is implemented at a centralized facility of the media monitoring entity 104 and the example media monitoring reference site 102 is implemented at a remote location (with other media monitoring reference sites at the same or other remote locations). Of course, in other examples, the media monitoring reference site 102 may be at the same geographic location as the centralized facility of the media monitoring entity 104. In some examples, one or more of the media lineup table generator 302, the example media lineup database 304, the example reference database generator 306, the example reference signature database 308, the example media series identifier 310, the example lineup comparator 312, the example tuning verifier 314, the example, communication interface 316, the example lineup analyzer 318, the example recurring segment detector 320, the example reference signature tagger 322, the example signature comparator 324, and/or the example program timing analyzer 326 may additionally or alternatively be implemented at the media monitoring reference site 102 (e.g., by the reference media data collector 110).

Flowcharts representative of example machine readable instructions for implementing the reference media data collector 110 of FIGS. 1 and/or 2 and/or the reference media processing system 112 of FIGS. 1 and/or 3 are shown in FIGS. 4, 5A and 5B, 6, and/or 7A and 7B. In these examples, the machine readable instructions comprise program(s) for execution by a processor such as the processors 812, 912 shown in the example processor platforms 800, 900 discussed below in connection with FIGS. 8 and 9. The program(s) may be embodied in software stored on a tangible computer readable storage medium such as a CD-ROM, a floppy disk, a hard drive, a digital versatile disk (DVD), a Blu-ray disk, or a memory associated with the processors 812, 912, but the entire program(s) and/or parts thereof could alternatively be executed by a device other than the processors 812, 912 and/or embodied in firmware or dedicated hardware. Further, although the example program(s) described with reference to the flowcharts illustrated in FIGS. 4, 5A and 5B, 6, and/or 7A and 7B, many other methods of implementing the example reference media data collector 110 and/or the example reference media processing system 112 may alternatively be used. For example, the order of execution of the blocks may be changed, and/or some of the blocks described may be changed, eliminated, or combined.

As mentioned above, the example processes of FIGS. 4, 5A and 5B, 6, and/or 7A and 7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5A and 5B, 6, and/or 7A and 7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
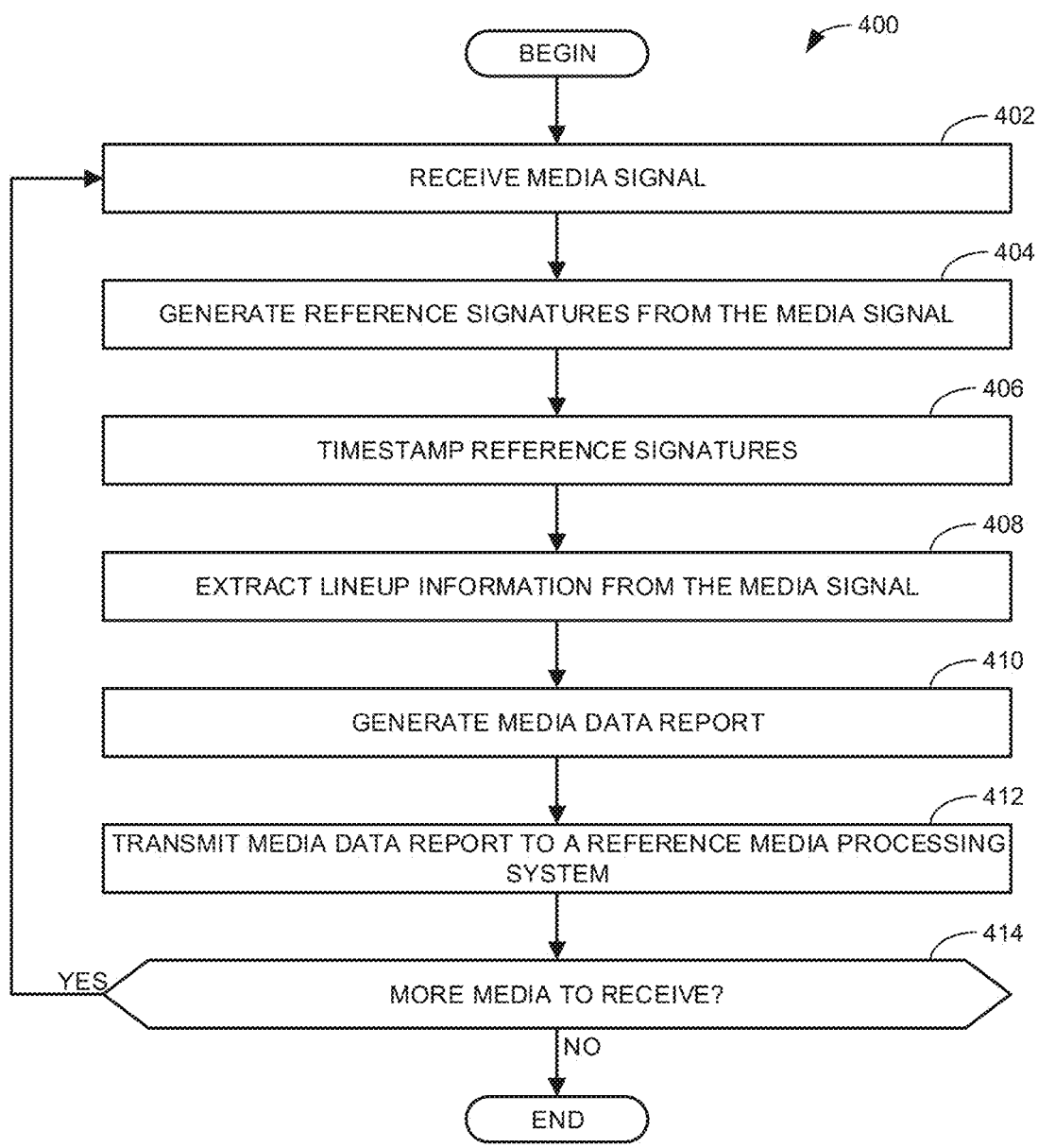
FIG. 4 is a flowchart representative of example machine readable instructions which may be executed to implement the example reference media data collector of FIGS. 1 and/or 2 to collect signature data.

Turning in detail to the figures, FIG. 4 is a flowchart 400 representative of example machine readable instructions which may be executed to implement the example reference media data collector 110 of FIGS. 1 and/or 2 to collect signature for populating a reference database (e.g., the reference database 308 of FIG. 3) with recurring segment reference signatures and/or to collect signature data to be compared with such recurring segment reference signatures to determine an actual airing time of media being monitored for comparison with tabulated lineup information. The example program of FIG. 4 begins at block 402 where the example receiver interface 202 receives a media signal. In some examples, the media signal corresponds to a known channel (designated by the media monitoring entity 104) to which a receiver 106 is tuned. At block 404, the example signature generator 204 generates reference signatures from the media signal. At block 406, the example signature generator 204 timestamps the reference signatures. At block

408, the example lineup information extractor 206 extracts lineup information (e.g., EIT data) from the media signal.

At block 410, the example media data report generator 210 generates a media data report. In some examples, the media data report includes the reference signatures with the associated timestamps. In some examples, the media data report includes the lineup information. At block 412, the example media data report generator 210 transmits the media data report to a reference media processing system 112. In some examples, the reference signatures are used to populate a reference signature database from which recurring segment reference signatures may be identified. Additionally or alternatively, in some examples, where corresponding recurring segment reference signatures have already been created, the reference signatures may be matched with the recurring segment reference signatures to identify the media series from which the reference signatures are collected. At block 414, the example receiver interface 202 determines whether there is more media to receive. If so, control returns to block 402. Otherwise, the example program of FIG. 4 ends.

Turning in detail to the figures, FIG. 5 is a flowchart 500 representative of example machine readable instructions which may be executed to implement the example reference media processing system 112 of FIGS. 1 and/or 3 to designate recurring segment reference signatures in a database of reference signatures. The example program of FIG. 5 begins at block 502 where the example lineup analyzer 318 identifies an episode of a media series. At block 504, the example lineup analyzer 318 identifies another episode of the media series. In some examples, the example lineup analyzer 318 identifies the two episodes based on lineup information obtained from a media provider 108 and/or a lineup data provider 116. In some examples, one of the episodes may be identified based on the media scheduled at a current time (e.g., real-time monitoring) and the second episode as an episode of the same media series that has been previously recorded (e.g., at the same time the prior week for a weekly program). In other examples, both of the episodes may be pre-recorded. In other examples, the first episode is identified based on the media scheduled at a current time and the second episode is identified as an upcoming episode yet to be aired (e.g., to be monitored in substantially real-time when it later airs). At block 506, the example recurring segment detector 320 searches for a matching signature present in both episodes corresponding to a recurring segment. In some examples, the matching signature is detected by comparing the signatures collected by the reference media data collector 110 over the period scheduled for each of the episodes and identifying signatures that match. In some examples, the signatures are matched based on an audio signal of the media. In some examples, the signatures are matched based on a video signal of the media. In some examples, both the audio signal and the video signal of the media are used to match the signatures. In some examples, the signatures are matched based on a portion of one or both of the audio signal and the video signal of the media.

At block 508 of the example program, the example reference signature tagger 322 identifies the temporal placement of the matching signature in each episode. In some examples, the example reference signature tagger 322 determines the temporal placement of the matching signature based on the difference between a scheduled start time of the each episode (e.g., indicated by lineup information) and the time of the matching signature (e.g., indicated by an associated time stamp).

At block 510, the example reference signature tagger 322 determines whether the temporal placement of the matching signature in each of the episodes approximately matches. In some examples, the temporal placement of the matching signature in each episode approximately matches if the difference between the temporal placements is less than a certain threshold (e.g., one minute, three minutes, five minutes, etc.). In this manner, the example reference signature tagger 322 can detect intro sequences that may have slightly different temporal placements due to pre-credit scenes of different duration but still be able to distinguish an intro sequence from a closing sequence. Further, in this manner, the example reference signature tagger 322 can detect other recurring segment(s) in episodes based on corresponding signatures that match at arbitrary points in time during each episode. Where the matching signature in each episode is at a different temporal placement, there is the possibility that the segment in each episode corresponding to the matching signature is an anomaly not truly indicative of a recurring segment in each episode of a media series. For example, recurring segments that do not appear at approximately the same temporal placement may correspond to short transitional scenes, establishing shots, etc., frequently used in media though not necessarily in every episode of a particular media series. Because such segments are not consistently used in every episode and because their temporal placement is somewhat arbitrary, they may not be reliable candidates for a recurring segment reference signature to positively identify a media series and/or to determine the timing of the episode. In some examples, network promos and/or certain commercial advertisements may appear repeatedly during multiple different episodes giving an indication of a recurring segment recurring in each of the episodes. However, such segments neither identify that an episode of the series is airing (because they may also occur during other programs) nor the timing of the airing (because it is unlikely their temporal placement will be consistent) and, thus, need to be excluded from designation as a recurring segment reference signature. Accordingly, in some examples, if the reference signature tagger 322 determines that the temporal placement of the matching signature in each episode does not approximately match, control advances to block 512 where the reference signature tagger 322 flags the detected matching signature from each episode before advancing to block 514 for further analysis. If the reference signature tagger 322 determines that the temporal placement of the matching signature in each episode does approximately match, control advances directly to block 514.

At block 514, the example reference signature tagger 322 designates (e.g., flags) the matching signature as a recurring segment reference signature. At block 516, the example reference signature tagger 322 assigns identifying information to the recurring segment reference signature. In some examples, the identifying information includes the identity of the media series from which the recurring segment was detected. At block 518, the example reference signature tagger 322 assigns temporal placement information to the recurring segment reference signature. In some examples, the temporal placement information includes information indicative of the temporal placement of the recurring segment within the episode (e.g., from a start time and/or other reference point).

At block 520, the example reference signature tagger 322 determines whether to obtain human verification of the recurring segment reference signature. In some examples, all signatures flagged as recurring segment references signatures are designated for manual verification. In some examples, only some signatures (e.g., signatures identified at block 512) are designated for verification. If the example reference signature tagger 322 determines to obtain human verification of the recurring segment reference signature (block 520), control advances to block 522 where the example communication interface 316 transmits the recurring segment reference signature, identifying information, and/or temporal placement information for verification.

At block 524, the example communication interface 316 receives verification feedback. At block 526, the example reference signature tagger 322 determines whether to keep the designation of the recurring segment reference signature as a recurring segment reference signature (e.g., based on the verification feedback). If the example reference signature tagger 322 determines not to keep the designation, control advances to block 528 where the example reference signature tagger 322 removes the designation of the matching reference signature as a recurring segment reference signature before advancing to block 532. If the example reference signature tagger 322 determines to keep the designation of the reference signature as a recurring segment reference signature (block 526), control advances to block 530 where the example reference signature tagger 322 stores the recurring segment reference signature designation with the identifying information and the temporal placement information in the reference signature database 308 before control advances to block 532. Returning to block 520, if the example reference signature tagger 322 determines not to obtain human verification of the recurring segment reference signature, control advances directly to block 530.

At block 532, the example recurring segment detector 320 determines whether there is another matching signature detected (e.g., from the same two episodes identified at blocks 502 and 504). If so, control returns to block 508. Otherwise, control advances to block 534 where the example reference signature tagger 322 determines whether to compare the recurring segment reference signature with another episode. In some examples, the reference signature tagger 322 determines to compare the recurring segment reference signature with another episode to further verify the detected recurring segment (represented by the recurring segment reference signature) as in fact present in each different episode in the media series (and not merely coincidentally in the first two episodes analyzed). If the example reference signature tagger 322 determines to compare the recurring segment reference signature with another episode, control returns to block 504. Otherwise, control advances to block 536 where the example lineup analyzer 318 determines whether to analyze another media series. If so, control returns to block 502. Otherwise, the example program of FIGS. 5A and 5B ends.

Figure 5A:
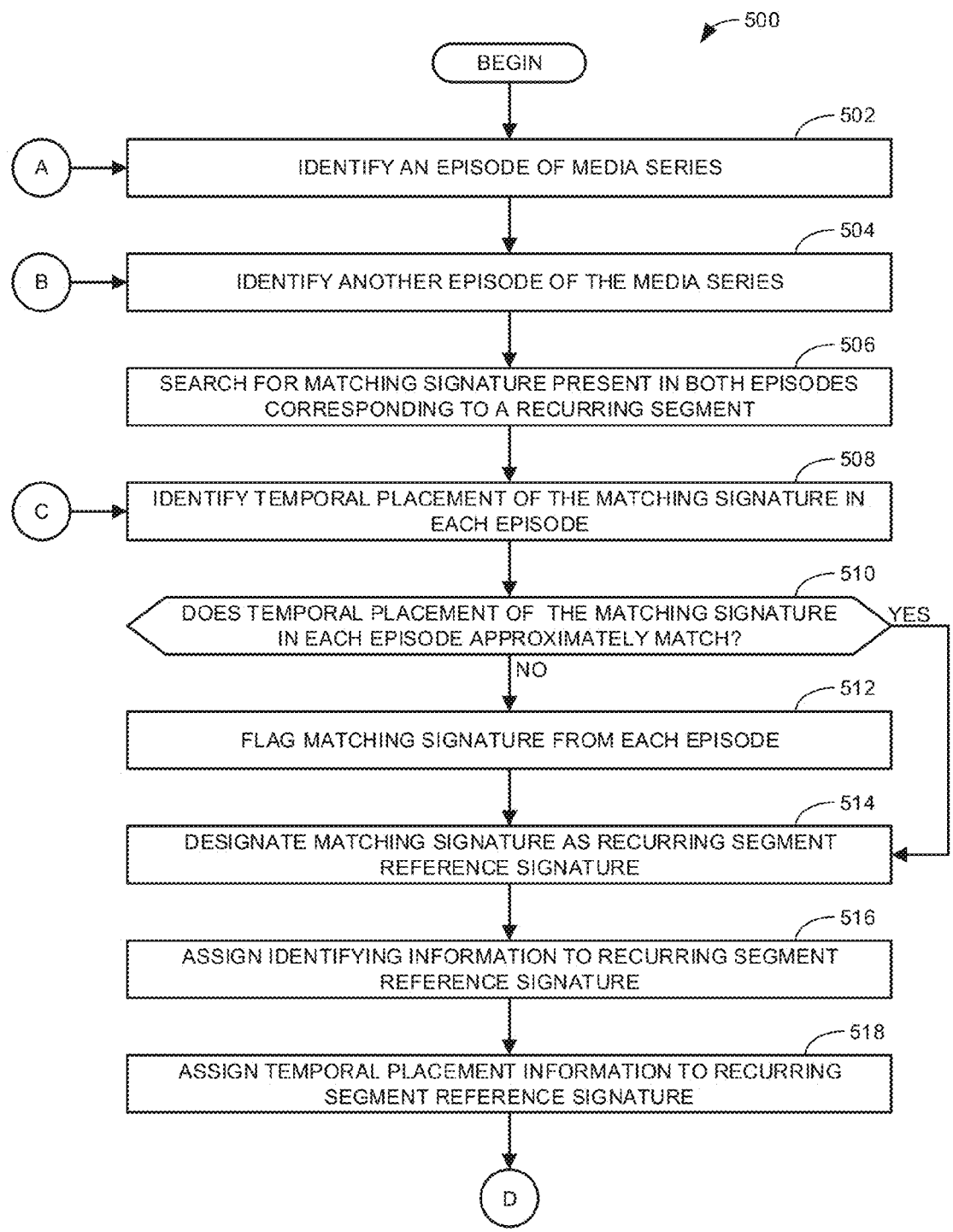
FIGS. 5A and 5B are a flowchart representative of example machine readable instructions which may be executed to implement the example reference media processing system of FIGS. 1 and/or 3 to designate recurring segment reference signatures in a database of reference signatures.
Figure 5B:
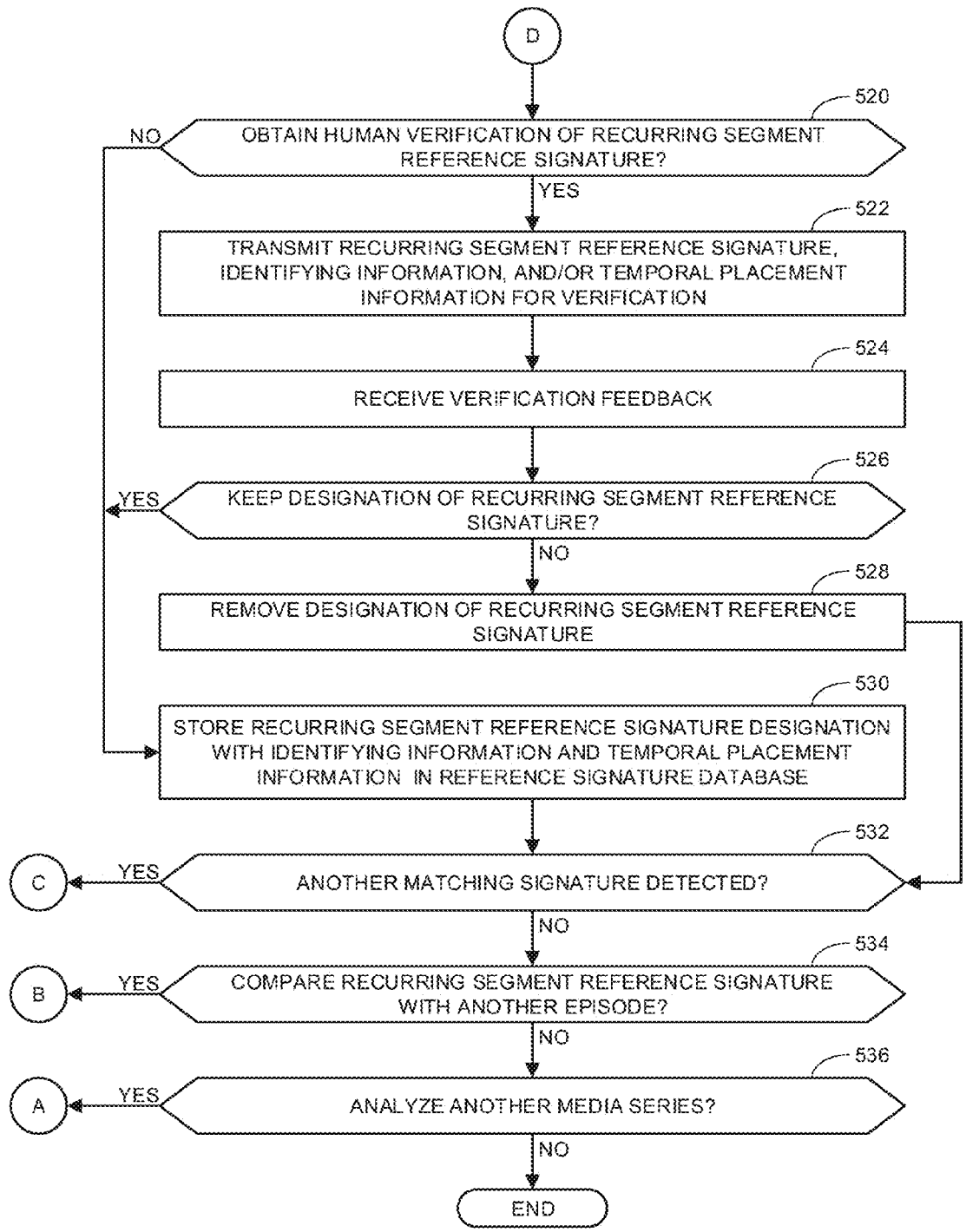
Figure 6:
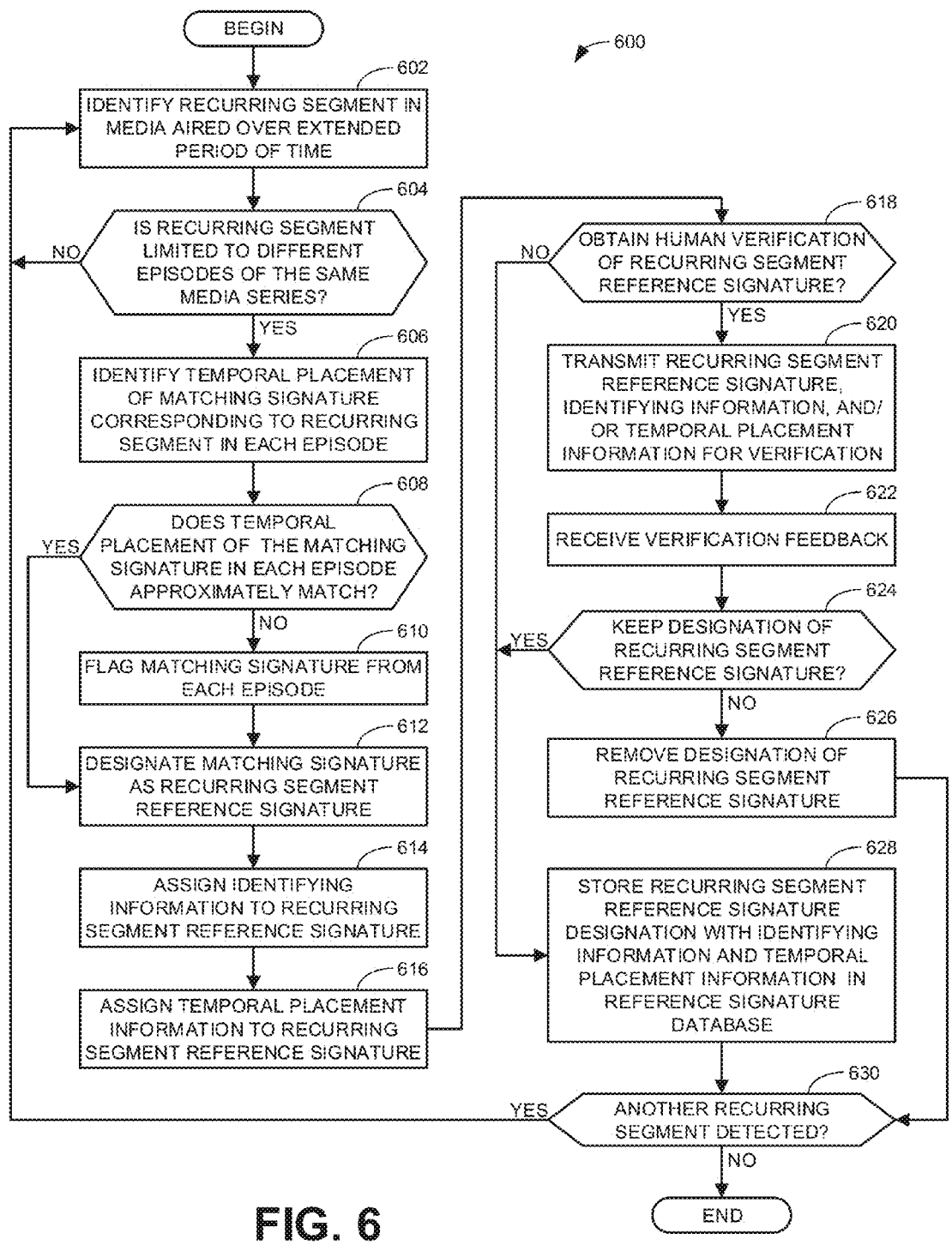
FIG. 6 is a flowchart representative of example machine readable instructions which may be executed to implement the example reference media processing system of FIGS. 1 and/or 3 to designate recurring segment reference signatures in a database of reference signatures.

FIG. 6 is a flowchart 600 representative of example instructions which may be executed to implement the example reference media processing system 112 of FIGS. 1 and/or 3 to designate recurring segment reference signatures in a database of reference signatures. The example program of FIG. 6 may additionally or alternatively be implemented instead of the example program of FIGS. 5A and 5B that detects recurring segments in media without first relying on lineup information. In particular, the example program of FIG. 6 begins at block 602 where the example recurring segment detector 320 identifies a recurring segment in media over an extended period of time (e.g., one week, eight days, two weeks, etc.). In some examples, the example recurring segment detector 320 identifies a recurring segment based on the identification of temporal spaced matching reference signatures collected by the reference media data collector 110 during the period of time being analyzed. In some examples, the recurring segment detector only identifies recurring segments (e.g., matching signatures) that are over a threshold duration (e.g., ten seconds) to filter out short portions of the media that may occur throughout various episodes of a media series that are not necessarily common to each episode.

At block 604, the example lineup analyzer 318 determines whether the recurring segment is limited to different episodes of the same media series. In some examples, the lineup analyzer 318 determines such by comparing the timing of each matching signature (corresponding to each occurrence of the recurring segment) over the period of time analyzed to lineup information indicating the programming content airing at the time of each instance of the matching signature. If the matching signature is collected from episodes associated with more than one media series, then matching signature cannot serve as a unique identifier (e.g., a recurring segment reference signature) for the associated media series. For example, such a matching signature may correspond to an advertisement repeating multiple times across multiple different programs. If the example lineup analyzer 318 determines that the recurring segment is not limited to different episodes of the same media series (block 604), control returns to block 602 to identify another recurring segment. If the example lineup analyzer 318 determines that the recurring segment is limited to different episodes of the same media series (block 604), control advances to block 606. In the illustrated example, blocks 606, 608, 610, 612, 614, 616, 618, 620, 622, 626, and 628 are implemented in the same manner as blocks 508, 510, 512, 514, 516, 518, 520, 522, 524, 526, and 528 of FIG. 5 as described above.

At block 630, the example recurring segment detector 320 determines whether there is another recurring segment detected (e.g., within the media over the period of time being analyzed). If so, control returns to block 602. Otherwise, the example program of FIG. 6 ends.

Figure 7A:
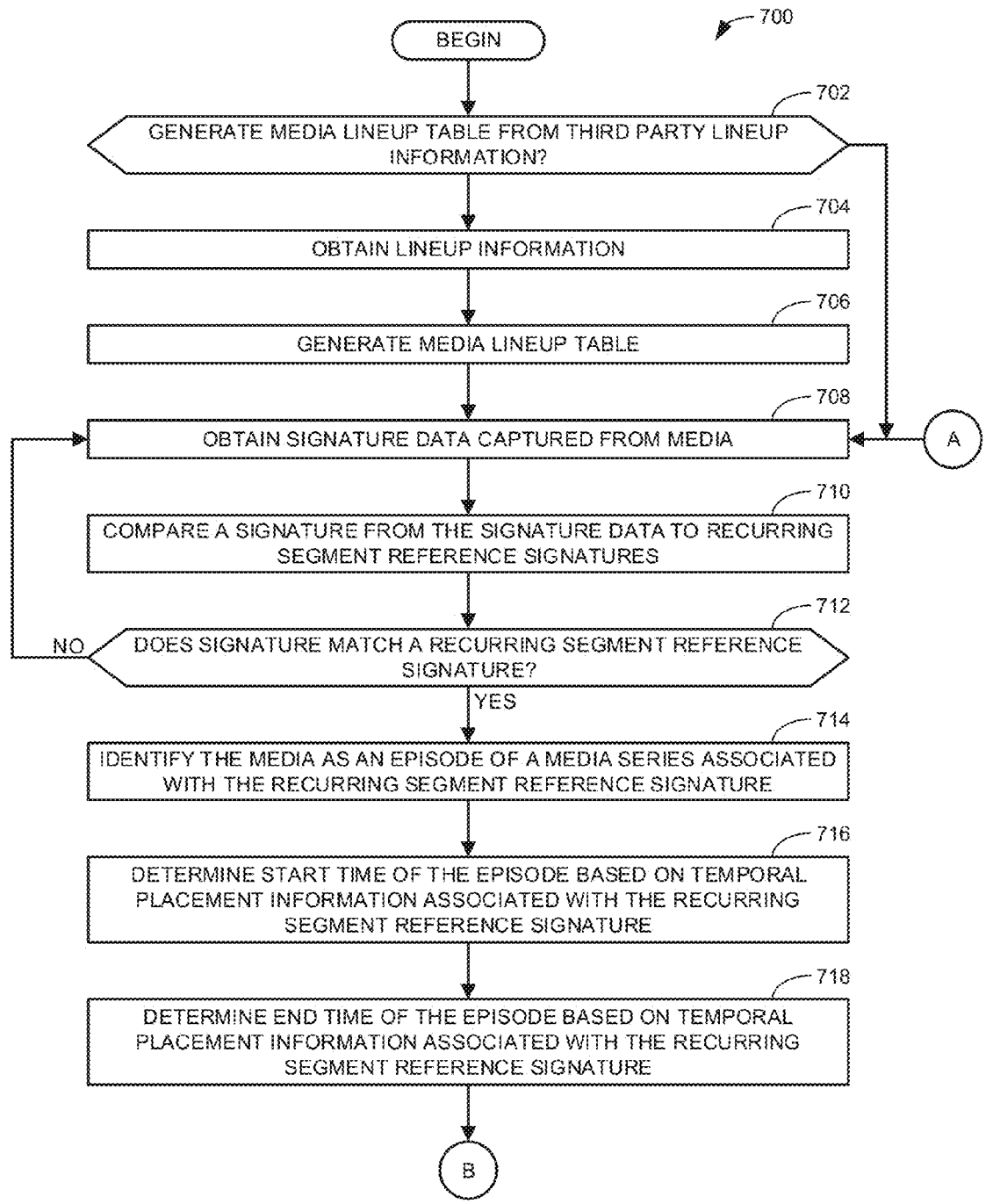
FIGS. 7A and 7B are a flowchart representative of example machine readable instructions which may be executed to implement the example reference media processing system of FIGS. 1 and/or 3 to verify, correct, and/or generate lineup information.
Figure 7B:
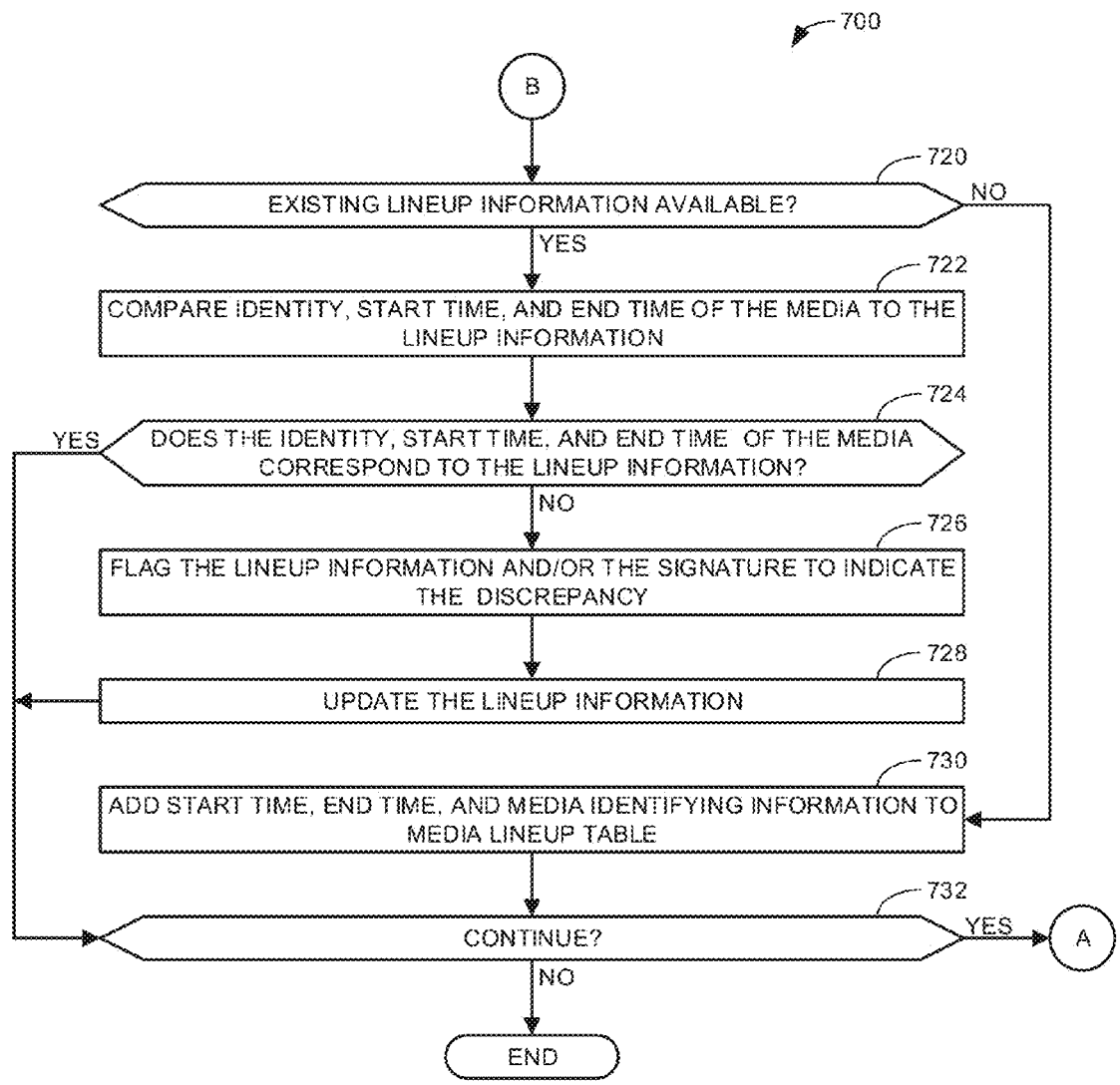

FIGS. 7A and 7B are a flowchart 700 representative of example machine readable instructions which may be executed to implement the example reference media processing system of FIGS. 1 and/or 3 to verify, correct, and/or generate lineup information. The example program begins at block 702 where the example media lineup table generator 302 determines whether to generate a media lineup table from third party lineup information. In some examples, the media lineup table generator 302 determines to generate a media lineup table if the table is to be based (at least initially) on third party lineup information and then verified and/or corrected based on the signature data collected from the reference media data collector 110. In some examples, the media lineup table generator 302 determines not to generate a media lineup table based on third party lineup information if the table is to be generated independently based on the signature data collected from the reference media data collector 110. If the example media lineup table generator 302 determines to generate a media lineup table from third party lineup information, control advances to block 704 where the example media lineup table generator 302 obtains the lineup information. At block 706, the example media lineup table generator 302 generates the media lineup table. For example, the media lineup table generator 302 may compile lineup information associated with different channels and/or organize the lineup information in a suitable matter for subsequent reference. Once the media lineup table is generated (block 706), control advances to block 708. Returning to block 702, if the example media lineup table generator 302 determines not to generate a media lineup table from third party lineup information, control advances directly to block 708.

At block 708, the example signature comparator 324 obtains signature data captured from media. In some examples, the signature data corresponds to the signatures collected by the reference media data collector 110. At block 710, the example signature comparator 324 compares a signature from the signature data to recurring segment reference signatures (e.g., previously identified and flagged as such in the reference signature database 308). At block 712, the example signature comparator 324 determines whether the signature matches a recurring segment reference signature. If the example signature comparator 324 determines that the signature does not match a recurring segment reference signature, control returns to block 708. If the example signature comparator 324 determines that the signature does match a recurring segment reference signature, control advances to block 714 where the example signature comparator 324 identifies the media as an episode of the media series associated with the recurring segment reference signature. That is, in some examples, the identifying information associated with the matching recurring segment reference signature is used to identify the media from which the signature data was collected.

At block 716, the example program timing analyzer 326 determines the start time of the episode based on temporal placement information associated with the recurring segment reference signature. In some examples, the temporal placement information associated with the recurring segment reference signature provides an indication of a temporal placement of the recurring segment reference signature within each episode of the media series relative to a certain reference point (e.g., start time, end time, etc.). Accordingly, in some examples, the program timing analyzer 326 determines the start time of the episode by going back from the time the signature data was collected (e.g., indicated via an associated timestamp) an amount time equal to the temporal placement of the recurring segment reference signature. For example, if the temporal placement of a recurring segment reference signature is 26 minutes and 36 seconds after the start time, a matching signature being timestamped at 8:14:40 pm would indicate a start time of 7:48:04 pm for the episode from which the signature was collected.

At block 718, the example program timing analyzer 326 determines an end time of the episode based on the temporal placement information associated with the recurring segment reference signature. In some examples, the end time of the episode is determined in a similar manner to determining the start time (block 716) except that the reference point for the temporal placement corresponds to the end time of the episode. In some examples, the timing of the intro sequence is used as an estimate of the start time of the episode and the closing sequence is used as an estimate of the end time of the episode without considering the temporal placement of each signature in the episode being monitored.

At block 720, the example media lineup table generator 302 determines whether there is existing lineup information available for the media. In some examples, if a media lineup table was determined to be generated from third party lineup information (at block 702), there will be existing lineup information in the previously generated media lineup table (block 706). In other examples, the existing lineup information corresponds to lineup information added to the media lineup table based on previously analyzed signature data (e.g., in a previous iteration of the example program of FIGS. 7A and 7B as described more fully below). If the example media lineup table generator 302 determines that there is existing lineup information available for the media, control advances to block 722 where the example lineup comparator 312 compares the identity, start time, and end time of the media to the lineup information. At block 722, the example lineup comparator 312 determines whether the identity, start time, and end time of the media correspond to the lineup information. In some examples, the identity, start time, and end time of the media correspond to the lineup information when the same media series is identified and any difference between the determined start and end times of the particular episode and the scheduled start and end times is less than a certain threshold (e.g., two minutes, three minutes, etc.). If the example lineup comparator 312 determines that the identity, start time, and end time of the media correspond to the lineup information (block 724), then the accuracy of the lineup information is verified for the particular episode of the identified media series associated with the collected signature data. In such examples, the program advances to block 732 to determine whether to continue.

If the example lineup comparator 312 determines that the identity, start time, and end time of the media do not correspond to the lineup information (block 724), control advances to block 726 where the example lineup comparator 312 flags the lineup information and/or the collected signature to indicate the discrepancy (e.g., for subsequent manual review). At block 728, the example media lineup table generator 302 updates the lineup information (e.g., updates the media lineup table containing the lineup information). In some examples, block 726 is omitted such that the lineup information is updated without the lineup information and/or the signature being flagged. In other examples, block 728 is omitted such that the lineup information and/or the signature are flagged but the lineup information is not altered. In some such examples, a manual review of the flagged information may then be performed to then determine whether to alter the lineup information. Once the lineup information is flagged and/or updated (blocks 726 and 728), control advances to block 732.

Returning to block 720, if the example media lineup table generator 302 determines that there is no existing lineup information available for the media, control advances to block 730. As described above, no lineup information may be available if third party lineup information was not used to generate the media lineup table and the signature identifies a new media series not already identified and added to the media lineup table. At block 730, the example media lineup table generator 302 adds the start time, the end time, and the media identifying information to the media lineup table, after which control advances to block 732. At block 732, the example signature comparator 324 determines whether to continue the example program. In some examples, the signature comparator 324 determines to continue if there are more signatures to analyze (e.g., there is additional and/or new signature data received from the reference media data collector 110). If the example signature comparator 324 determines to continue, control returns to block 708 to repeat the process with additional collected signatures.

In some examples, the additional signatures (after returning to block 708) may correspond to the same episode of the same media series previously identified. For example, the first signature that matches a recurring segment reference signature may correspond to an intro sequence of the episode while a subsequent matching signature may correspond to the closing sequence of the episode. In some such examples, the determination of the start time of the episode (determined at block 716) based on the first signature may be different than when calculated based on the second signature. In some such examples, the first determination becomes available lineup information (e.g., once the lineup information is updated (block 728) or added to a new media lineup table (block 730)) such that when the example program reaches block 720 a second time, the second determination of the start time (determined at block 716) will be compared with the first determination. Accordingly, in some examples, the last signature detected for an episode (e.g., corresponding to the closing sequence) will govern the determination of the actual timing of the episode. This approach is reliable because the temporal placement of the closing sequence is typically relatively constant across multiple different episodes, whereas the temporal placement of the intro sequence and/or other recurring segments may exhibit greater variation between different episodes because of the rest of the content in the episode (e.g., the pre-credit scene). If the example signature comparator 324 determines not to continue (block 732), the example program of FIGS. 7A and 7B ends.

Figure 8:
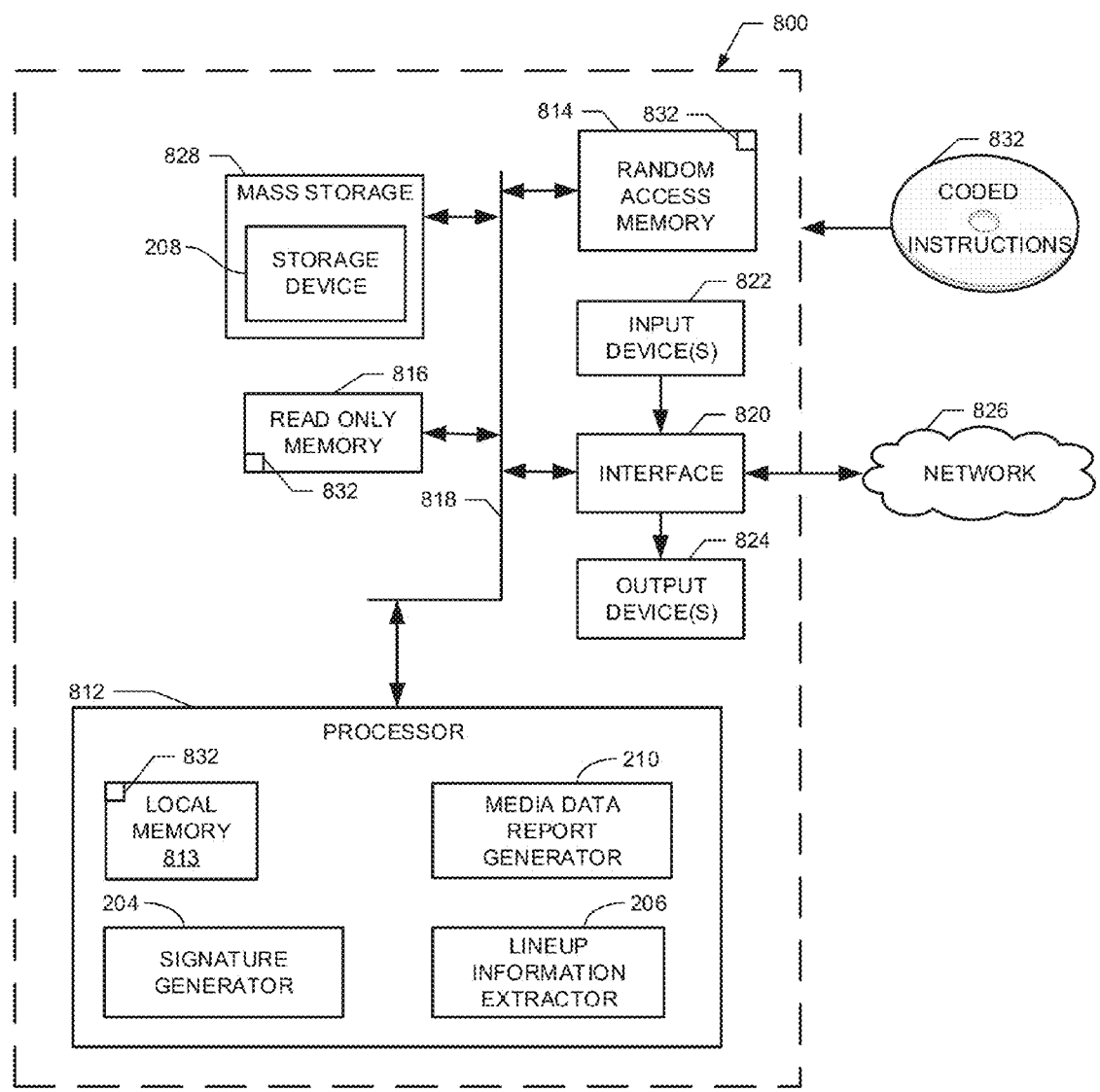
FIG. 8 is a block diagram of an example processor platform structured to execute the instructions of FIG. 4 to implement the reference media data collector of FIGS. 1 and/or 2.

FIG. 8 is a block diagram of an example processor platform 800 structured to execute the instructions of FIG. 4 to implement the reference media data collector 110 of FIG. 2. The processor platform 800 can be, for example, a server, a personal computer, or any other type of computing device.

The processor platform 800 of the illustrated example includes a processor 812. The processor 812 of the illustrated example is a software based hardware device. For example, the processor 812 can be implemented by one or more integrated circuits, logic circuits, microprocessors or controllers from any desired family or manufacturer.

The processor 812 of the illustrated example includes a local memory 813 (e.g., a cache). In the illustrated example, the processor 812 implements the example signature generator 204, the example lineup information extractor 206, and/or the example media data report generator 210 of FIG. 2. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. For example, the mass storage device 828 may include the example storage device 208. Examples of such mass storage devices 828 include floppy disk drives, hard drive disks, compact disk drives, Blu-ray disk drives, RAID systems, and digital versatile disk (DVD) drives.

The coded instructions 832 of FIGS. 5A and 5B, 6, and/or 7A and 7B may be stored in the mass storage device 828, in the local memory 813, in the volatile memory 814, in the non-volatile memory 816, and/or on a removable tangible computer readable storage medium such as a CD or DVD.

Figure 9:
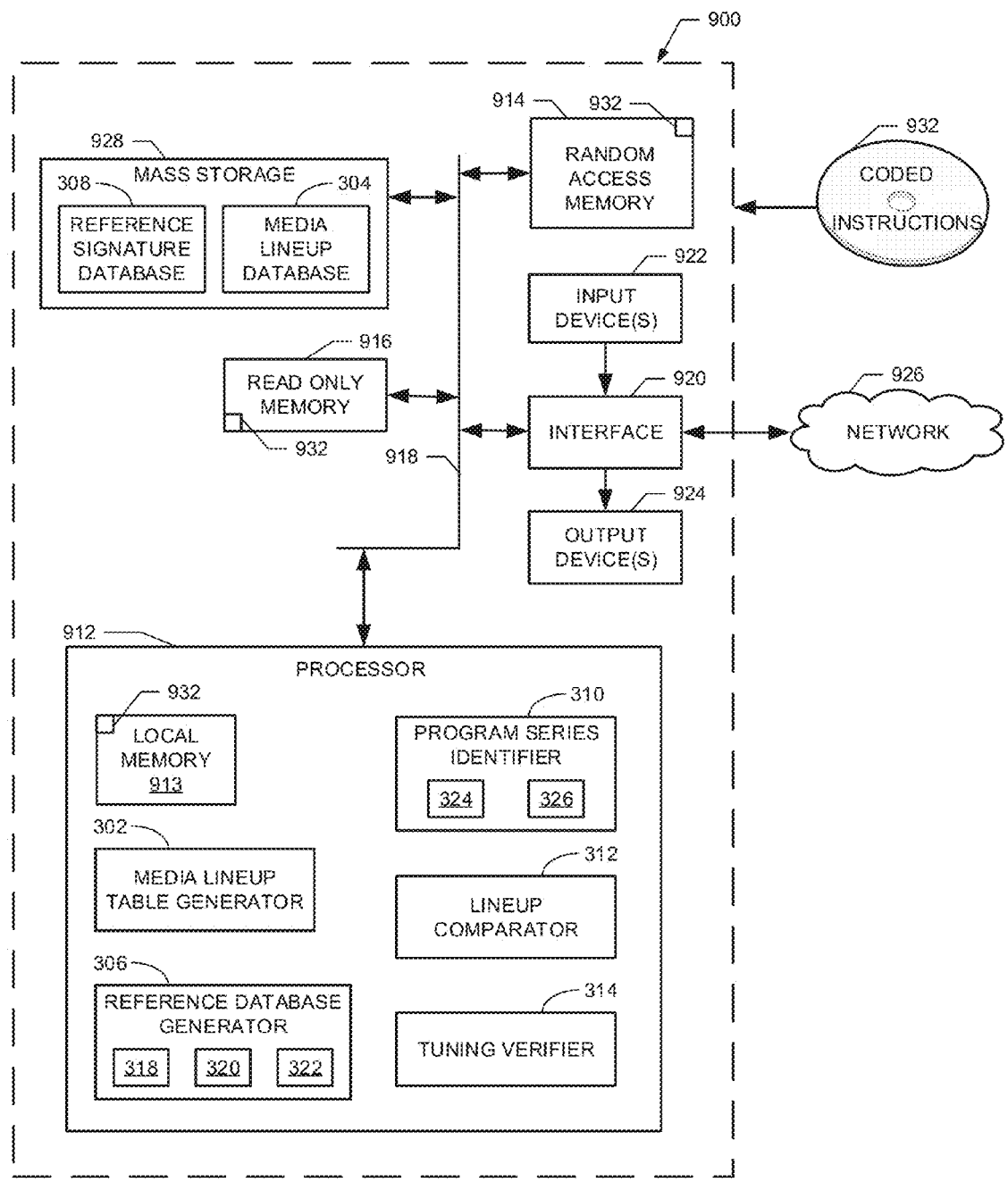
FIG. 9 is a block diagram of an example processor platform structured to execute the instructions of FIGS. 5A and 5B, 6, and/or 7A and 7B to implement the reference media processing system of FIGS. 1 and/or 3.

FIG. 9 is a block diagram of an example processor platform 900 structured to execute the instructions of FIGS. 5A and 5B, 6, and/or 7A and 7B to implement the reference media processing system 112 of FIG. 3. The processor platform 900 can be, for example, a server, a personal computer, or any other type of computing device.

The processor platform 900 of the illustrated example includes a processor 912. The processor 912 of the illustrated example is a software based hardware device. For example, the processor 912 can be implemented by one or more integrated circuits, logic circuits, microprocessors or controllers from any desired family or manufacturer.

The processor 912 of the illustrated example includes a local memory 913 (e.g., a cache). In the illustrated example, the processor 912 implements the example media lineup table generator 302, the example reference database generator 306 (including the example lineup analyzer 318, the example recurring segment detector 320, the example reference signature tagger 322), the example media series identifier 310 (including the example signature comparator 324, and/or the example program timing analyzer 326), the example lineup comparator 312, and/or the example tuning verifier 314 of FIG. 3. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. For example, the mass storage device 928 may include the example media lineup database 304 and/or the example reference signature database 308. Examples of such mass storage devices 928 include floppy disk drives, hard drive disks, compact disk drives, Blu-ray disk drives, RAID systems, and digital versatile disk (DVD) drives.

The coded instructions 932 of FIGS. 5A and 5B, 6, and/or 7A and 7B may be stored in the mass storage device 928, in the local memory 913, in the volatile memory 914, in the non-volatile memory 916, and/or on a removable tangible computer readable storage medium such as a CD or DVD.

From the foregoing, it will appreciate that systems, methods, and articles of manufacture have been disclosed that improve upon existing media monitoring techniques. In particular, examples disclosed herein enable the identification of particular media (e.g., media series) based on signatures collected from the media. This is especially relevant for linear media (e.g., television, radio, etc.) where new content is developed by media providers for which recurring segment reference signatures are not available and/or when delays may shift broadcast schedule without notice. While it may be possible to generate unique signatures for every episode of every media series to identify such media in the future, there is considerable time and expense involved. Examples disclosed herein significantly improve the efficiency of such systems by identifying limited segments (e.g., intro sequences, closing sequences, etc.) that recur in multiple different episodes of the same media series but are unique relative to all other media series. In this manner, episodes can quickly be identified as corresponding to the media series. Indeed, new episodes can be detected in substantially real-time as the corresponding recurring segments are aired. Further, the processing power, and memory demands of the example media processing systems described herein can be significantly reduced because only the recurring segments need to be identified, stored, and/or analyzed.

Additionally, the example systems, methods, and articles of manufacture described herein enable a media monitoring entity to verify lineup information with the media that is actually aired at a corresponding time. In this manner, any inaccuracies in lineup information due to unanticipated and/or unexpected lineup changes can be detected and corrected. As a result, audience measurement metrics based on lineup information (e.g., looking up particular media identified by detected watermarks) are more reliable without the need for manual review of all the lineup information and/or all media being presented. This enables a computer to operate more efficiently by properly identifying media using reliable lineup data (e.g., watermarks that designate a channel and time can safely be relied upon only if the lineup used to identify the corresponding media is reliable).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
comparing, by executing an instruction with a processor, first signature data representative of a first episode of multiple different episodes of a media series to second signature data representative of a second episode of the multiple different episodes of the media series;
identifying, by executing an instruction with the processor, recurring media segments in the multiple different episodes when (1) a first portion of the first signature data and a second portion of the second signature data match, and (2) the matching first and second portions have respective first and second temporal placements within the corresponding first and second episodes that differ within a threshold;
designating, by executing an instruction with the processor, the matching portions of the first signature data and the second signature data as recurring segment reference signatures for the media series; and
storing the recurring segment reference signatures in combination with associated information identifying the media series in a database.

2. The method of claim 1, wherein the respective first and second temporal placements are identified relative to respective start times of the first and second episodes.

3. The method of claim 1, further including:
outputting the recurring segment reference signatures and the associated information identifying the media series; and
receiving verification that the recurring segments in the matching portions of the first signature data and the second signature data correspond to the recurring segments in the multiple different episodes.

4. The method of claim 1, further including identifying the first signature data and the second signature data based on lineup information defining a schedule for presentation of the first and second episodes.

5. The method of claim 1, further including:
monitoring media programming over a period of time, the media programming including the first episode of the media series, the second episode of the media series, and other media unrelated to the media series; and
identifying the first signature data and the second signature data based on lineup information defining a schedule for presentation of the first and second episodes.

6. The method of claim 5, wherein the period of time is at least one week.

7. The method of claim 1, further including:
comparing third signature data representative of monitored media to the recurring segment reference signatures; and
when the third signature data matches one of the recurring segment reference signatures, generating identifying information indicating the monitored media is an episode of the media series.

8. An apparatus comprising:
a recurring segment detector to compare first signature data representative of a first episode of multiple different episodes of a media series to second signature data representative of a second episode of the multiple different episodes of the media series, the recurring segment detector to identify recurring media segments in the multiple different episodes when (1) a first portion of the first signature data and a second portion of the second signature data match, and (2) the matching first and second portions have respective first and second temporal placements within the corresponding first and second episodes that differ within a threshold;
a reference signature tagger to designate the matching portions of the first signature data and the second signature data as recurring segment reference signatures for the media series; and
a reference signature database to store the recurring segment reference signatures in combination with associated information identifying the media series in a database.

9. The apparatus of claim 8, wherein the respective first and second temporal placements are identified relative to respective start times of the first and second episodes.

10. The apparatus of claim 8, further including a communication interface to:
output the recurring segment reference signatures and the associated information identifying the media series; and
receive verification that the recurring segments in the matching portions of the first signature data and the second signature data correspond to the recurring segments in the multiple different episodes.

11. The apparatus of claim 8, further including a lineup analyzer to identify the first signature data and the second signature data based on lineup information defining a schedule for presentation of the first and second episodes.

12. The apparatus of claim 8, wherein the recurring segment detector is to:
monitor media programming over a period of time, the media programming including the first episode of the media series, the second episode of the media series, and other media unrelated to the media series; and
identify the first signature data and the second signature data based on lineup information defining a schedule for presentation of the first and second episodes.

13. The apparatus of claim 12, wherein the period of time is at least one week.

14. The apparatus of claim 8, further including a series identifier to:
compare third signature data representative of monitored media to the recurring segment reference signatures; and
when the third signature data matches one of the recurring segment reference signatures, generate identifying information indicating the monitored media is an episode of the media series.

15. A non-transitory computer readable medium comprising computer readable instructions that, when executed, cause a machine to at least:
compare first signature data representative of a first episode of multiple different episodes of a media series to second signature data representative of a second episode of the multiple different episodes of the media series;
identify recurring media segments in the multiple different episodes when (1) a first portion of the first signature data and a second portion of the second signature data match, and (2) the matching first and second portions have respective first and second temporal placements within the corresponding first and second episodes that differ within a threshold;
designate the matching portions of the first signature data and the second signature data as recurring segment reference signatures for the media series; and
store the recurring segment reference signatures in combination with associated information identifying the media series in a database.

16. The computer readable medium of claim 15, wherein the respective first and second temporal placements are identified relative to respective start times of the first and second episodes.

17. The computer readable medium of claim 15, wherein the instructions further cause the machine to:
output the recurring segment reference signatures and the associated information identifying the media series; and
receive verification that the recurring segments in the matching portions of the first signature data and the second signature data correspond to the recurring segments in the multiple different episodes.

18. The computer readable medium of claim 15, wherein the instructions further cause the machine to identify the first signature data and the second signature data based on lineup information defining a schedule for presentation of the first and second episodes.

19. The computer readable medium of claim 15, wherein the instructions further cause the machine to:
monitor media programming over a period of time, the media programming including the first episode of the media series, the second episode of the media series, and other media unrelated to the media series; and
identify the first signature data and the second signature data based on lineup information defining a schedule for presentation of the first and second episodes.

20. The computer readable medium of claim 19, wherein the period of time is at least one week.

* * * * *